US012755156B2

(12) United States Patent
Xu et al.

(10) Patent No.: US 12,755,156 B2
(45) Date of Patent: Oct. 6, 2026

(54) NEURAL NETWORK MODEL COMPRESSION METHOD AND APPARATUS, STORAGE MEDIUM, AND CHIP

(71) Applicant: HUAWEI TECHNOLOGIES CO., LTD., Shenzhen (CN)

(72) Inventors: Yixing Xu, Beijing (CN); Hanting Chen, Beijing (CN); Kai Han, Beijing (CN); Yunhe Wang, Beijing (CN); Chunjing Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1152 days.

(21) Appl. No.: 17/680,630

(22) Filed: Feb. 25, 2022

(65) Prior Publication Data

US 2022/0180199 A1 Jun. 9, 2022

Related U.S. Application Data

(63) Continuation of application No. PCT/CN2020/097957, filed on Jun. 24, 2020.

(30) Foreign Application Priority Data

Sep. 4, 2019 (CN) ......................... 201910833833.9

(51) Int. Cl.
*G06N 3/084* (2023.01)
*G06N 3/045* (2023.01)
(Continued)

(52) U.S. Cl.
CPC ............. *G06N 3/084* (2013.01); *G06N 3/045* (2023.01); *G06N 3/08* (2013.01); *G06V 10/454* (2022.01);
(Continued)

(58) Field of Classification Search
CPC .......... G06N 3/084; G06N 3/045; G06N 3/08; G06N 20/00; G06N 20/10; G06N 20/20;
(Continued)

(56) References Cited

U.S. PATENT DOCUMENTS 10,325,220 B2 * 6/2019 Li .......................... G06N 20/00
10,552,735 B1 * 2/2020 Widerhorn ............ G06N 20/20
(Continued)

FOREIGN PATENT DOCUMENTS

CA 2989159 A1 * 3/2018 ........... A61B 8/0841
CA 3004008 A1 * 11/2018 ........... G06F 16/358
(Continued)

OTHER PUBLICATIONS

Xu et al.,"Positive-Unlabeled Compression on the Cloud", 33rd Conference on Neural Information Processing Systems (NeurIPS 2019), Vancouver, Canada, total:10 pages.
(Continued)

*Primary Examiner* — Steven P Sax
(74) *Attorney, Agent, or Firm* — Maier & Maier, PLLC

(57) ABSTRACT

A neural network model compression method in the field of artificial intelligence. The method includes: obtaining, by a server, a first neural network model and training data of the first neural network that are uploaded by user equipment; obtaining a positive-unlabeled (PU) classifier based on the training data of the first neural network and unlabeled data stored in the server; selecting, by using the PU classifier, extended data from the unlabeled data stored in the server, where the extended data has a property and distribution similar to a property and distribution of the training data of the first neural network model; and training a second neural network model by using a knowledge distillation (KD) method based on the extended data, where the first neural network model is used as a teacher network model and the
(Continued)

second neural network model is used as a student network model.

15 Claims, 7 Drawing Sheets

(51) Int. Cl.

| | |
|---|---|
| ***G06N 3/08*** | (2023.01) |
| ***G06V 10/44*** | (2022.01) |
| ***G06V 10/82*** | (2022.01) |
| *G06F 18/214* | (2023.01) |
| *G06F 18/2415* | (2023.01) |
| *G06F 18/25* | (2023.01) |

(52) U.S. Cl.
CPC ............ *G06V 10/82* (2022.01); *G06F 18/214* (2023.01); *G06F 18/2415* (2023.01); *G06F 18/253* (2023.01)

(58) Field of Classification Search
CPC ...... G06V 10/454; G06V 10/82; A61B 5/681; A61B 6/502; A61B 8/0841; G16B 20/00; G06F 16/358; G06F 18/214; G06F 18/253; G06F 18/2415
See application file for complete search history.

(56) References Cited

U.S. PATENT DOCUMENTS

| | | | | |
|---|---|---|---|---|
| 10,552,736 | B1 * | 2/2020 | Abad | G06N 3/08 |
| 10,785,318 | B2 * | 9/2020 | Dhamnani | G06F 18/2433 |
| 11,087,179 | B2 * | 8/2021 | Yadav | G06F 16/951 |
| 11,501,195 | B2 * | 11/2022 | Rose | G06N 20/00 |
| 11,586,915 | B2 * | 2/2023 | Macready | G06N 3/0455 |
| 2014/0172754 | A1 * | 6/2014 | He | G06N 5/02 706/12 |
| 2017/0140253 | A1 * | 5/2017 | Wshah | G06N 3/08 |
| 2018/0260695 | A1 * | 9/2018 | Majumdar | G06N 3/084 |
| 2018/0268203 | A1 | 9/2018 | Sohn et al. | |
| 2019/0209022 | A1 * | 7/2019 | Sobol | A61B 5/681 |
| 2021/0232870 | A1 * | 7/2021 | Washio | G06F 18/2415 |
| 2022/0292328 | A1 * | 9/2022 | Yang | G06N 3/08 |

FOREIGN PATENT DOCUMENTS

| | | | | | |
|---|---|---|---|---|---|
| CA | 3066775 | A1 | * | 4/2019 | G16B 20/00 |
| CA | 3102174 | A1 | * | 12/2019 | A61B 6/502 |
| CN | 104951804 | A | * | 9/2015 | G06F 18/24 |
| CN | 106202177 | A | * | 12/2016 | G06F 16/355 |
| CN | 107273454 | A | * | 10/2017 | G06Q 30/0201 |
| CN | 107403201 | A | * | 11/2017 | G06F 18/241 |
| CN | 110059189 | A | | 7/2019 | |
| CN | 110059717 | A | | 7/2019 | |
| CN | 110363228 | A | * | 10/2019 | G06F 18/214 |
| CN | 111340053 | A | * | 6/2020 | G06F 18/2155 |
| CN | 109213862 | B | * | 11/2020 | |
| CN | 109685743 | B | * | 1/2023 | G06T 5/70 |
| CN | 111382771 | B | * | 3/2024 | G06F 18/254 |
| EP | 3430576 | B1 | * | 8/2024 | G06N 3/096 |
| JP | 2022016709 | A | * | 1/2022 | G06N 3/08 |
| KR | 20200052444 | A | * | 5/2020 | G06N 20/20 |
| KR | 102196522 | B1 | * | 12/2020 | G06N 3/045 |
| KR | 102314219 | B1 | * | 10/2021 | G16B 20/00 |
| RU | 2788482 | C2 | * | 1/2023 | |
| TW | I726341 | B | * | 5/2021 | G06F 18/24 |
| WO | WO-2015094281 | A1 | * | 6/2015 | G06F 16/90 |

OTHER PUBLICATIONS

Hinton et al.,"Distilling the Knowledge in a Neural Network", arXiv preprint arXiv:1503.02531; Submitted on Mar. 9, 2015, total: 9 pages.
Chen et al.,"Data-Free Learning of Student Networks", 2019 IEEE/CVF International Conference on Computer Vision (ICCV), total: 9 pages.
Chen et al.,"Compressing Neural Networks with the Hashing Trick"; International conference on machine learning; PMLR, 2015, total:10 pages.

* cited by examiner

NEURAL NETWORK MODEL COMPRESSION METHOD AND APPARATUS, STORAGE MEDIUM, AND CHIP

CROSS-REFERENCE TO RELATED APPLICATIONS

This application is a continuation of International Application No. PCT/CN2020/097957, filed on Jun. 24, 2020, which claims priority to Chinese Patent Application No. 201910833833.9, filed on Sep. 4, 2019. The disclosures of the aforementioned applications are hereby incorporated by reference in their entireties.

TECHNICAL FIELD

The embodiments relate to the field of artificial intelligence, and a neural network model compression method and apparatus.

BACKGROUND

Artificial intelligence (AI) is a theory, a method, a technology, or an application system that simulates, extends, and expands human intelligence by using a digital computer or a machine controlled by a digital computer, to perceive an environment, obtain knowledge, and achieve an optimal result by using the knowledge. In other words, artificial intelligence is a branch of computer science, and is intended to understand essence of intelligence and produce a new intelligent machine that can react in a manner similar to human intelligence. Artificial intelligence is to study design principles and implementation methods of various intelligent machines, so that the machines have perceiving, inference, and decision-making functions.

Computer vision is an integral part of various intelligent/autonomic systems in various application fields, such as manufacturing industry, inspection, document analysis, medical diagnosis, and military affairs. The computer vision is knowledge about how to use a camera/video camera and a computer to obtain required data and information of a photographed subject. To be vivid, eyes (the camera/video camera) and a brain (an algorithm) are mounted on the computer to replace human eyes to recognize, track, and measure a target, so that the computer can perceive an environment. The "perceiving" may be considered as extracting information from a perceptual signal. Therefore, the computer vision may also be considered as a science of studying how to enable an artificial system to perform "perceiving" in an image or multi-dimensional data. In conclusion, the computer vision is to replace a visual organ with various imaging systems to obtain input information, and then replace the brain with the computer to process and interpret the input information. An ultimate study objective of the computer vision is to enable the computer to observe and understand the world through vision in a way that human beings do, and to have a capability of autonomously adapting to the environment.

A convolutional neural network model usually has a large quantity of redundant parameters. The existing convolutional neural network model may be compressed and accelerated, so that the CNN network is applied to a terminal device having a limited operational capability such as a smartphone. In a neural network model compression technology, massive training data needs to be provided to achieve a relatively good network convergence result. However, uploading massive data to a cloud end by a user is time-consuming, and deteriorates user experience. Some neural network model compression technologies use only a small amount of training data to compress the model, but the compressed neural network model can hardly achieve a satisfactory result.

SUMMARY

A neural network model compression method and apparatus, a storage medium, and a chip may reduce an amount of data to be transmitted and improve user experience.

According to a first aspect, a neural network model compression method is provided and includes the following steps: A server obtains a first neural network model and training data of the first neural network that are uploaded by user equipment; the server obtains a positive-unlabeled (PU) classifier by using a PU learning algorithm based on the training data of the first neural network and unlabeled data stored in the server; the server selects, by using the PU classifier, extended data from the unlabeled data stored in the server, where the extended data is data having a property and distribution similar to a property and distribution of the training data of the first neural network model; and the server trains a second neural network model by using a knowledge distillation (KD) method based on the extended data, where the first neural network model is used as a teacher network model of the KD method and the second neural network model is used as a student network model of the KD method.

The PU classifier is obtained through training by using the training data of the first neural network and the unlabeled data, and the unlabeled data is classified to obtain the data having the property and distribution similar to the property and distribution of the training data of the first neural network model. Based on the data having the property and distribution similar to the property and distribution of the training data of the first neural network model, neural network model compression can be implemented, and an amount of data to be transmitted is reduced while accuracy of neural network model compression is ensured.

With reference to the first aspect, in some possible implementations, the server obtains the positive-unlabeled (PU) classifier by using the PU learning algorithm based on the training data of the first neural network, the unlabeled data stored in the server, and proportion information, where a loss function of the PU learning algorithm is an expectation of a training loss of the training data of the first neural network and the unlabeled data stored in the server, the proportion information is used to indicate a proportion of the extended data to the unlabeled data stored in the server, and the proportion information is used to calculate the expectation.

Based on proportion information of positive sample data in second data, an expectation of a training loss of first data and the second data is calculated as the loss function of the PU learning algorithm, to train the PU classifier.

With reference to the first aspect, in some possible implementations, the training data of the first neural network model is a part of training data used to train the first neural network model.

The user equipment uploads the part of training data used to train the first neural network model, to reduce an amount of uploaded data and improve user experience.

With reference to the first aspect, in some possible implementations, the part of training data includes data of each of a plurality of classes output by the first neural network.

The training data of the first neural network model uploaded by the user includes data of each of a plurality of classes that can be processed by the first neural network, so that the second neural network obtained through training can process data of the plurality of classes, to improve accuracy of compressing the first neural network model.

With reference to the first aspect, in some possible implementations, the PU classifier is obtained based on a first feature and the proportion information, the first feature is obtained based on fusion of a plurality of third features, the plurality of third features are obtained by performing feature extraction by using the first neural network model on the training data of the first neural network and the unlabeled data stored in the server, and the plurality of third features are in a one-to-one correspondence with a plurality of layers of the first neural network; and that the server selects, by using the PU classifier, extended data from the unlabeled data stored in the server includes: the server performs, by using the first neural network model, feature extraction on the unlabeled data stored in the server, to obtain a second feature; and the server inputs the second feature into the PU classifier, to determine the extended data. Because the first neural network model is used to perform feature extraction on the data for training the PU classifier, time for training the PU classifier is reduced, and efficiency is improved.

With reference to the first aspect, in some possible implementations, the first feature is obtained by fusing the plurality of third features that undergo a first weight adjustment, the first weight adjustment is performed based on the proportion information, the second feature is obtained by fusing a plurality of fourth features by using a first weight, and the plurality of fourth features are in a one-to-one correspondence with the plurality of layers of the first neural network.

The weight adjustment is performed on features output by different layers of the first neural network model, and extracted features are fused based on adjusted weights, so that accuracy of a classification result of the PU classifier is improved.

With reference to the first aspect, in some possible implementations, that the server trains a second neural network model by using a KD method based on the extended data includes: the server inputs the extended data into the first neural network model, to classify the extended data and obtain extended data of a plurality of classes and a second weight of extended data of each of the plurality of classes; and the server minimizes a loss function of the KD algorithm to obtain a trained second neural network model, where the loss function of the KD algorithm is a sum of products of training errors of extended data of all of the plurality of classes and second weights of the extended data of all the classes.

Based on an amount of positive sample data in the unlabeled data in the classes that can be processed by the first neural network model, a weight corresponding to data of each class in the loss function of the KD algorithm is adjusted, and when distributions of the positive sample data in different classes are unbalanced, the neural network model obtained through training can obtain a relatively good classification result for the data of each class.

With reference to the first aspect, in some possible implementations, the second weights of the extended data of all the classes include a plurality of perturbed weights obtained after random perturbation is performed on initial weights of the extended data of all the classes, and the loss function of the KD algorithm includes a plurality of loss functions in a one-to-one correspondence with the plurality of perturbed weights, where an initial weight of the extended data of each class is in negative correlation with an amount of the extended data of each class; and that the server minimizes a loss function of the KD algorithm to obtain a trained second neural network model includes: the server minimizes maximum values of the plurality of loss functions to obtain the trained second neural network model.

Random perturbation is performed on weights in the loss functions of the KD algorithm, the loss functions of the KD algorithm of the neural network model in different perturbation cases are calculated, and a neural network model that minimizes the maximum values of the plurality of loss functions is used as the neural network model obtained through training. Therefore, adverse impact of a classification error of the teacher network model on accuracy of the neural network model obtained through training is reduced, and accuracy of the neural network model obtained through training is improved.

According to a second aspect, a neural network model compression apparatus is provided. The apparatus includes each module configured to perform the method in the first aspect.

According to a third aspect, a computer device is provided and includes: a memory, configured to store a program; and a processor, configured to execute the program stored in the memory. When the program stored in the memory is executed, the processor is configured to perform the method in the first aspect.

It should be understood that the computer device may be a server. The server may be deployed at a cloud end. The computer device has an operational capability.

According to a fourth aspect, a computer storage medium is provided. The computer-readable storage medium stores program code, and the program code includes instructions used to perform steps of the method in the first aspect.

According to a fifth aspect, a computer program product including instructions is provided. When the computer program product is run on a computer, the computer is enabled to perform the method in the first aspect.

According to a sixth aspect, a chip is provided. The chip includes at least one processor. When program instructions are executed in the at least one processor, the chip is enabled to perform the method in the first aspect.

Optionally, in an implementation, the chip may further include a memory. The memory stores instructions. The processor is configured to execute the instructions stored in the memory, and when executing the instructions, the processor is configured to perform the method in the first aspect.

The chip may be a field programmable gate array (FPGA) or an application-specific integrated circuit (ASIC).

It should be understood that the method in the first aspect may refer to the method in any one of the first aspect or the implementations of the first aspect.

DETAILED DESCRIPTION OF THE EMBODIMENTS

Figure 1:
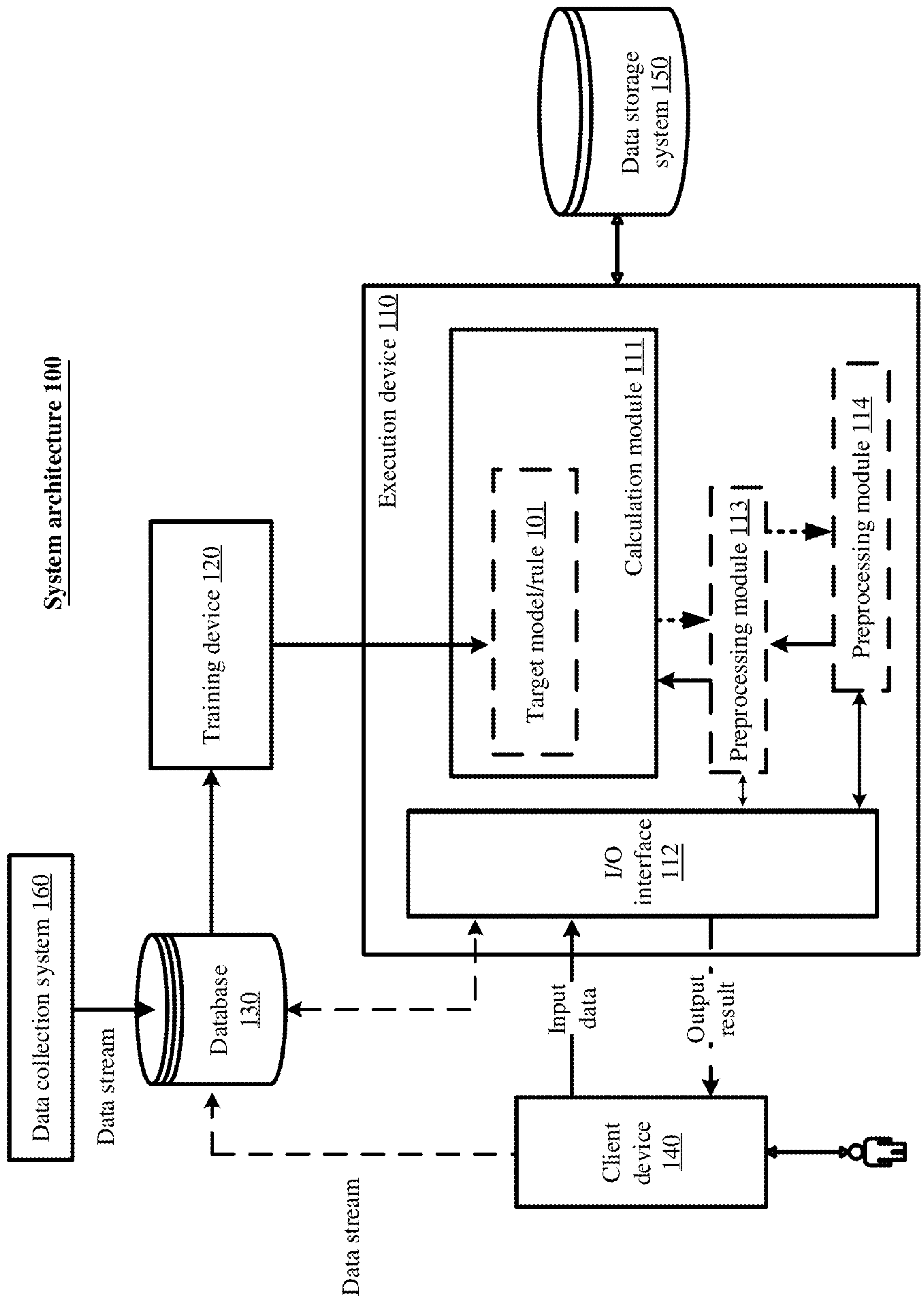
FIG. 1 is a schematic diagram of a structure of a system architecture according to an embodiment.

The following describes solutions with reference to the accompanying drawings.

Because embodiments relate to massive application of a neural network model, for ease of understanding, the following first describes related terms and related concepts such as a neural network model in the embodiments.

(1) Neural Network Model

The neural network model may include a neuron. The neuron may be an operation unit that uses $x_s$ and an intercept of b as an input, where an output of the operation unit may be as follows:

$$h_{W,b}(x) = f(W^T x) = f\left(\sum_{s=1}^{n} W_s x_s + b\right)$$

Herein, s=1, 2, . . . , or n, n is a natural number greater than 1, $W_s$ represents a weight of $x_s$, b represents a bias of the neuron, and f represents an activation function (activation function) of the neuron, where the activation function is used to introduce a non-linear characteristic into the neural network model, to convert an input signal in the neuron into an output signal. The output signal of the activation function may be used as an input of a next convolutional layer. The activation function may be a sigmoid function. The neural network model is a network obtained by joining a plurality of single neurons together. An output of a neuron may be an input of another neuron. An input of each neuron may be connected to a local receptive field of a previous layer to extract a feature of the local receptive field. The local receptive field may be a region including several neurons.

(2) Deep Neural Network Model

The deep neural network (DNN) model is also referred to as a multi-layer neural network model and may be understood as a neural network model having a plurality of hidden layers. There is no special measurement criterion for "plurality" herein. Based on locations of different layers in the DNN, a neural network model in the DNN may be divided into three types: an input layer, a hidden layer, and an output layer. Generally, the first layer is the input layer, the last layer is the output layer, and the middle layer is the hidden layer. For example, in a fully connected neural network model, layers are fully connected. In other words, any neuron at an $i^{th}$ layer needs to be connected to any neuron at an $(i+1)^{th}$ layer. Although the DNN seems to be complex, the DNN is not complex in terms of work at each layer, and is simply expressed as the following linear relationship: $\vec{y}=\alpha(W\vec{x}+\vec{b})$, where $\vec{x}$ is an input vector, $\vec{y}$ is an output vector, $\vec{b}$ is an offset vector, W is a weight matrix (which is also referred to as a coefficient), and $\alpha(\ )$ is an activation function. At each layer, the output vector $\vec{y}$ is obtained by performing such a simple operation on the input vector $\vec{x}$. Because there is a plurality of layers in the DNN, there are also a plurality of coefficients W and bias vectors $\vec{b}$. Definitions of these parameters in the DNN are as follows: The coefficient W is used as an example. It is assumed that in a three-layer DNN, a linear coefficient from a fourth neuron at a second layer to a second neuron at a third layer is defined as $$W_{24}^{3}.$$

A superscript 3 represents a number of a layer in which the coefficient W is located, and a subscript corresponds to an index 2 of the third layer for output and an index 4 of the second layer for input. In conclusion, a coefficient from a $k^{th}$ neuron at an $(L-1)^{th}$ layer to a $j^{th}$ neuron at an $L^{th}$ layer is defined as $$W_{jk}^{L}.$$

It should be noted that the input layer has no parameter W. In the deep neural network model, more hidden layers make the network more capable of describing a complex case in the real world. Theoretically, a model with more parameters has higher complexity and a larger "capacity". It indicates that the model can complete a more complex learning task. Training the deep neural network model is a process of learning a weight matrix, and a final objective of the training is to obtain a weight matrix of all layers of a trained deep neural network model (a weight matrix including vectors W at a plurality of layers).

(3) Convolutional Neural Network Model

The convolutional neural network (CNN) model is a deep neural network model with a convolutional structure. The convolutional neural network model includes a feature extractor including a convolutional layer and a sub-sampling layer. The feature extractor may be considered as a filter. A convolution process may be considered as performing convolution by using a trainable filter and an input image or a convolution feature map (feature map). The convolutional layer is a neuron layer that performs convolution processing on an input signal that is in the convolutional neural network model. At the convolutional layer of the convolutional neural network model, one neuron may be connected only to some adjacent-layer neurons. A convolutional layer generally includes several feature planes, and each feature plane may include some rectanglarly-arranged neurons. Neurons in a same feature plane share a weight, and the shared weight herein is a convolution kernel. Weight sharing may be understood as that a manner of extracting image information is unrelated to a location. A principle implied herein is that statistical information of a part of an image is the same as that of another part. Image information that is learned in a part can also be used in another part. Therefore, same learned image information can be used for all locations in the image. At a same convolutional layer, a plurality of convolution kernels may be used to extract different image information. Usually, a larger quantity of convolution kernels indicates richer image information reflected by a convolution operation.

The convolution kernel may be initialized in a form of a random-size matrix. In a process of training the convolutional neural network model, an appropriate weight may be obtained for the convolution kernel through learning. In addition, a direct benefit brought by weight sharing is that connections between layers of the convolutional neural network model are reduced, and a risk of overfitting is reduced.

(4) Loss Function

In a process of training the deep neural network model, it is expected that an output of the deep neural network model is close, as much as possible, to a value that really needs to be predicted. Therefore, a predicted value of a current network and a target value that is really expected may be compared, and then a weight vector of the neural network model at each layer is updated based on a difference between the predicted value and the target value (further, there is usually an initialization process before the first update, parameters are preconfigured for all layers of the deep neural network model). For example, if the predicted value of the network is large, the weight vector is adjusted to decrease the predicted value, and adjustment is continuously performed until the deep neural network model can predict the target value that is actually expected or a value that is very close to the target value that is actually expected. Therefore, "how to obtain, through comparison, the difference between the predicted value and the target value" needs to be predefined. This is the loss function or an objective function. The loss function and the objective function are important equations used to measure the difference between the predicted value and the target value. The loss function is used as an example. A higher output value (loss) of the loss function indicates a larger difference. Therefore, training of the deep neural network model is a process of minimizing the loss as much as possible.

(5) Residual Network

As a depth of the neural network model increases continuously, a degradation problem occurs. As the depth of the neural network model increases, accuracy increases first, then reaches saturation, and then decreases as the depth continues to increase. A greatest difference between a common direct convolutional neural network model and the residual network (ResNet) is that the ResNet has a plurality of bypass branches connecting an input directly to a subsequent layer, protects integrity of information by directly bypassing input information to an output, and resolves the degradation problem. The residual network includes a convolutional layer and/or a pooling layer.

The residual network may be: in addition to layer-by-layer connections between a plurality of hidden layers in the deep neural network model, for example, a connection between a first hidden layer and a second hidden layer, a connection between the second hidden layer and a third hidden layer, and a connection between the third hidden layer and a fourth hidden layer (this is a data operation path of the neural network model, and may also be visually referred to as neural network model transmission), the residual network further has an additional direct branch. The direct branch is directly connected from the first hidden layer to the fourth hidden layer, that is, by skipping processing of the second and third hidden layers, the direct branch directly transmits data of the first hidden layer to the fourth hidden layer for an operation. A highway network may be: in addition to the foregoing operation path and direct branch, the deep neural network model further includes a weight obtaining branch. The branch introduces a transform gate to obtain a weight value, and outputs a weight value T for use in a subsequent operation of the foregoing operation path and direct branch.

(6) Back Propagation Algorithm

In a training process, a convolutional neural network model may correct values of parameters in an initial neural network model by using an error back propagation (BP) algorithm, so that a reconstruction error loss of the neural network model becomes increasingly smaller. An input signal is forward transferred until an error loss is generated in an output, and the parameters in the initial neural network model are updated based on back propagation error loss information, so that the error loss is reduced. The back propagation algorithm is a back propagation motion dependent on the error loss and aims to obtain parameters of an optimal neural network model, for example, a weight matrix.

(7) Attention Mechanism

The attention mechanism simulates an internal process of biological observation behavior and is a mechanism that aligns internal experience with external feeling to increase observation precision of some regions. The mechanism can quickly select high-value information from a large amount of information by using limited attention resources. The attention mechanism is widely used in natural language processing tasks, especially machine translation, because the attention mechanism can quickly extract an important feature of sparse data. A self-attention mechanism is an improvement of the attention mechanism. The self-attention mechanism reduces dependence on external information and is better at capturing an internal correlation of data or features. An essential idea of the attention mechanism can be expressed by the following formula:

$$\text{Attention(Query, Source)} = \sum_{i=1}^{L_x} \text{Similarity(Query, Key}_i) * \text{Value}_i.$$

Lx=||Source|| represents a length of a source. A meaning of the formula is that constituent elements in the source are considered to be constituted by a series of <Key, Value> data pairs. In this case, given an element Query in a target, a weight coefficient of a value corresponding to each key is obtained by calculating similarity or a correlation between Query and the key, and then weighted summation is performed on values to obtain a final attention value. Therefore, in essence, the attention mechanism is to perform weighted summation on values of the elements in the source, where Query and a key are used to calculate a weight coefficient of a corresponding value. Conceptually, the attention mechanism can be understood as a mechanism for selecting a small amount of important information from a large amount of information and focusing on the important information but ignoring most unimportant information. A focus process is reflected in calculation of a weight coefficient. A larger weight indicates that a value corresponding to the weight is more focused. In other words, the weight indicates importance of information, and the value indicates the information corresponding to the weight. The self-attention mechanism may be understood as an intra attention mechanism. The attention mechanism occurs between the element Query in the target and all elements in the source. The self-attention mechanism is an attention mechanism that occurs between elements in the source or between elements in the target and may also be understood as an attention calculation mechanism in a special case of Target=Source. A calculation process of the self-attention mechanism is the same except that a calculation object changes.

(8) Pixel Value

A pixel value of an image may be a red green blue (RGB) color value, and the pixel value may be a long integer representing a color. For example, the pixel value is 256×Red+100×Green+76×Blue, where Blue represents a blue component, Green represents a green component, and Red represents a red component. In each color component, a smaller value indicates lower brightness, and a larger value indicates higher brightness. For a grayscale image, a pixel value may be a grayscale value.

(9) Knowledge Distillation

A relatively large complex network usually has good performance, but also has a lot of redundant information, resulting in a large quantity of operations and high consumption of resources. Distilling knowledge in a neural network model is to extract useful information from a complex network and migrate the information to a smaller network. In this way, a learned small network can have a performance effect close to that of a large complex network, and computing resources are greatly saved. This complex network may be referred to as a teacher network model, and the small network may be referred to as a student network model.

(10) Positive-Unlabeled Learning

Positive-unlabeled learning (PU learning) is a semi-supervised machine learning method. By using this method, in given data, only a part of positive sample data is labeled, and other positive sample data and all negative sample data are unlabeled. In this case, a two-class classifier is trained through learning, to classify the unlabeled data and determine the positive sample data and the negative sample data.

The foregoing briefly describes some basic content of the neural network. The following describes some neural networks that may be used in image data processing.

The following describes in detail a system architecture in an embodiment with reference to FIG. 1.

FIG. 1 is a schematic diagram of a system architecture according to an embodiment. As shown in FIG. 1, a system architecture 100 includes an execution device 110, a training device 120, a database 130, a client device 140, a data storage system 150, and a data collection system 160.

In addition, the execution device 110 includes a calculation module 111, an I/O interface 112, a preprocessing module 113, and a preprocessing module 114. The calculation module 111 may include a target model/rule 101, and the preprocessing module 113 and the preprocessing module 114 are optional.

The data collection device 160 is configured to collect training data. In this embodiment, the training data includes training data of a first neural network, the first neural network model, and unlabeled data stored in a server. The training data is stored in the database 130, and the training device 120 obtains the target model/rule 101 through training based on the training data maintained in the database 130.

Figure 3:
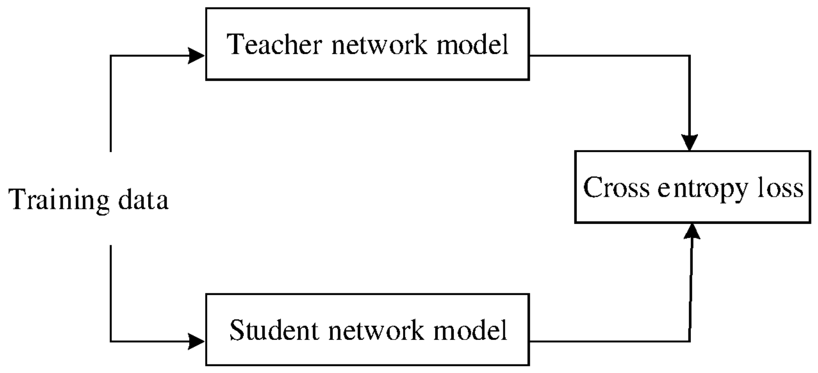
FIG. 3 is a schematic diagram of a neural network model compression method.

The following describes how the training device 120 obtains the target model/rule 101 based on the training data. The target model/rule 101 can be configured to implement a neural network model compression method in an embodiment. The training data of the first neural network and the first neural network model are input into the target model/rule 101, and a second neural network model may be obtained through training. The target model/rule 101 in this embodiment may be a neural network. It should be noted that, during actual application, the training data maintained in the database 130 is not necessarily collected by the data collection device 160 but may be received from another device. It should be further noted that the training device 120 may not necessarily train the target model/rule 101 based on the training data maintained in the database 130 or may obtain training data from a cloud or another place to perform model training. The foregoing description should not be construed as a limitation on this embodiment. The target model/rule 101 obtained by the training device 120 through training may be applied to different systems or devices, for example, applied to the execution device 110 shown in FIG. 3. The execution device 110 may be a terminal, such as a mobile phone terminal, a tablet computer, a notebook computer, an augmented reality (AR) terminal, a virtual reality (VR) terminal, or a vehicle-mounted terminal, or may be a server, a cloud, or the like. In FIG. 3, the input/output (I/O) interface 112 is configured for the execution device 110 and configured to exchange data with an external device. A user may input data to the I/O interface 112 by using the client device 140. The input data may include the training data of the first neural network and the first neural network model. The client device 140 herein may be user equipment.

The preprocessing module 113 and the preprocessing module 114 are configured to perform preprocessing based on the input data received by the I/O interface 112. In this embodiment, the preprocessing module 113 and the preprocessing module 114 may not exist, or there may be only one preprocessing module. When the preprocessing module 113 and the preprocessing module 114 do not exist, the calculation module 111 may be directly used to process the input data.

In a process in which the execution device 110 performs preprocessing on the input data or the calculation module 111 of the execution device 110 performs related processing such as calculation, the execution device 110 may invoke data, code, and the like in a data storage system 150 for corresponding processing, and may also store data, instructions, and the like obtained through corresponding processing into the data storage system 150.

Finally, the I/O interface 112 presents a processing result, for example, the trained second neural network model obtained through calculation by the target model/rule 101, to the client device 140, to provide the processing result to the user.

The trained second neural network model obtained through processing by the target model/rule 101 in the calculation module 111 may be processed by the preprocessing module 113 (and may also be processed by the preprocessing module 114), then a processing result is sent to the I/O interface, and then the processing result is sent to the client device 140 through the I/O interface.

It should be understood that, when the preprocessing module 113 and the preprocessing module 114 do not exist in the foregoing system architecture 100, the calculation module 111 may further transmit the trained second neural network model obtained through processing to the I/O interface. The processing result is then sent through the I/O interface to the client device 140 for displaying.

It should be noted that the training device 120 may generate corresponding target models/rules 101 for different targets or different tasks based on different training data. The corresponding target models/rules 101 may be used to implement the foregoing targets or complete the foregoing tasks, to provide a desired result for the user.

In a case shown in FIG. 3, the user may manually input data and the user may input the data on an interface provided by the I/O interface 112. In another case, the client device 140 may automatically send input data to the I/O interface 112. If it is required that the client device 140 needs to obtain authorization from the user to automatically send the input data, the user may set corresponding permission on the client device 140. The user may view, on the client device 140, a result output by the execution device 110. The result may be presented in a form of displaying, a sound, an action, or the like. The client device 140 may also serve as a data collection end to collect, as new sample data, input data that is input into the I/O interface 112 and an output result that is output from the I/O interface 112 that are shown in the figure and store the new sample data into the database 130. Further, the client device 140 may alternatively not perform collection, but the I/O interface 112 directly stores, as new sample data into the database 130, input data that is input into the I/O interface 112 and an output result that is output from the I/O interface 112 that are shown in the figure.

It should be noted that FIG. 1 is merely a schematic diagram of a system architecture according to an embodiment. A location relationship between the devices, the components, the modules, and the like shown in the figure does not constitute any limitation. For example, in FIG. 1, the data storage system 150 is an external memory relative to the execution device 110, but in another case, the data storage system 150 may alternatively be disposed in the execution device 110.

As shown in FIG. 3, the target model/rule 101 obtained through training based on the training device 120 may be a neural network in this embodiment. Neural networks provided in this embodiment may be CNNs, deep convolutional neural networks (DCNNs), and the like.

Because the CNN is a very common neural network, a structure of the CNN is described in detail below with reference to FIG. 2. As described in the foregoing basic concepts, the convolutional neural network model is a deep neural network model with a convolutional structure and is a deep learning architecture. In the deep learning architecture, multi-layer learning is performed at different abstract levels according to a machine learning algorithm. As a deep learning architecture, the CNN is a feed-forward artificial neural network model, and each neuron in the feed-forward artificial neural network model can respond to an image input into the feed-forward artificial neural network model.

Figure 2:
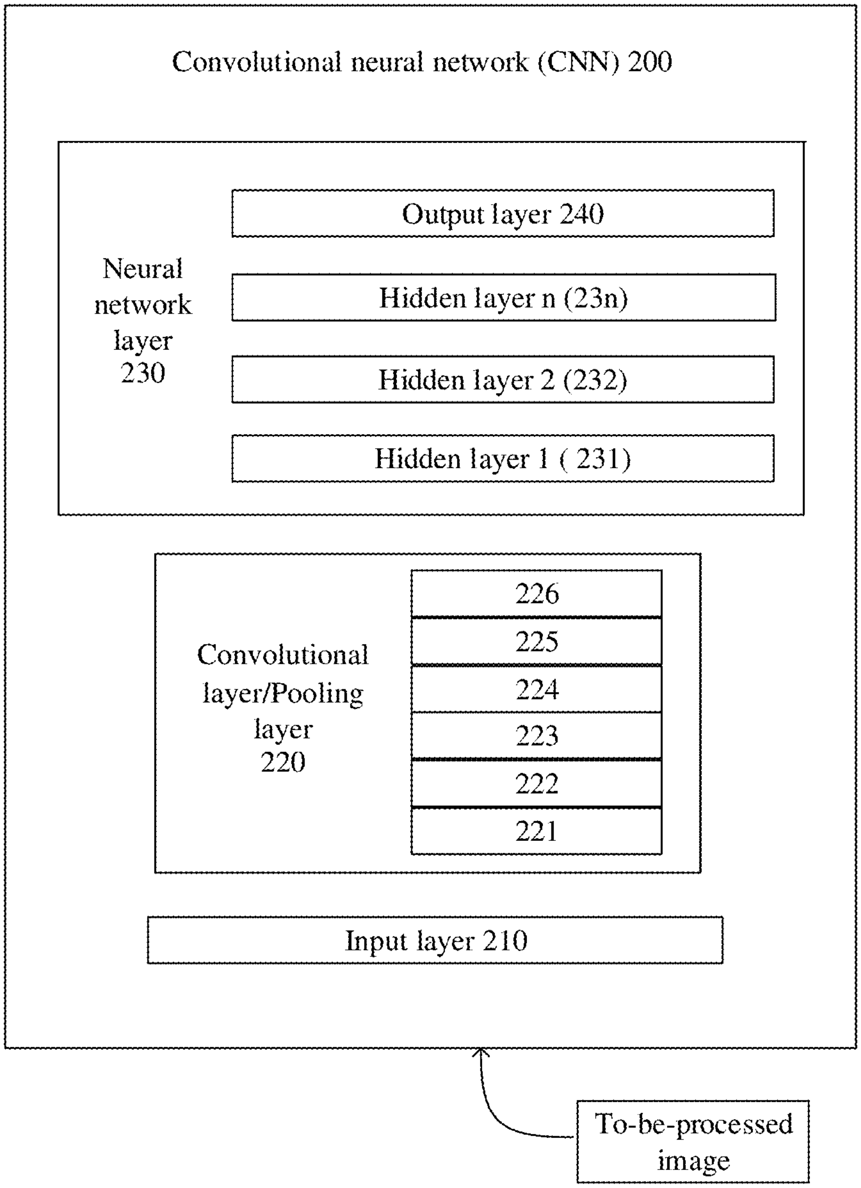
FIG. 2 is a schematic diagram of a convolutional neural network model.

As shown in FIG. 2, a convolutional neural network (CNN) model 200 may include an input layer 210, a convolutional layer/pooling layer 220 (where the pooling layer is optional), and a neural network model layer 230.

Convolutional Layer/Pooling Layer 220:

Convolutional Layer:

As shown in FIG. 2, the convolutional layers/pooling layers 220 may include layers 221 to 226 shown as an example. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layers 221 and 222 are convolutional layers, the layer 223 is a pooling layer, the layers 224 and 225 are convolutional layers, and the layer 226 is a pooling layer. In other words, an output of a convolutional layer may be used as an input for a subsequent pooling layer or may be used as an input for another convolutional layer, to continue to perform a convolution operation.

The following describes internal working principles of the convolutional layer by using the convolutional layer 221 as an example.

The convolutional layer 221 may include a plurality of convolution operators. The convolution operator is also referred to as a kernel. In image processing, the convolution operator functions as a filter that extracts information from an input image matrix. The convolution operator may be a weight matrix, and the weight matrix may be predefined. In a process of performing a convolution operation on an image, the weight matrix usually processes pixels at a granularity level of one pixel (or two pixels, depending on a value of a stride in a horizontal direction on an input image, to extract a feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows×columns), that is, a plurality of same-type matrices, are applied. Outputs of the weight matrices are superimposed to form a depth dimension of a convolutional image. The dimension herein may be understood as being determined based on the foregoing "plurality". Different weight matrices may be used to extract different features from the image. For example, one weight matrix is used to extract edge information of the image, another weight matrix is used to extract a color of the image, and a further weight matrix is used to blur unneeded noise in the image. Sizes of the plurality of weight matrices (rows×columns) are the same. Sizes of feature maps extracted from the plurality of weight matrices with the same size are also the same, and then the plurality of extracted feature maps with the same size are combined to form an output of the convolution operation.

Weight values in these weight matrices need to be obtained through a lot of training during actual application. Each weight matrix formed by using the weight values obtained through training may be used to extract information from an input image, to enable the convolutional neural network model 200 to perform correct prediction.

When the convolutional neural network model 200 has a plurality of convolutional layers, an initial convolutional layer (for example, the layer 221) usually extracts more general features, where the general features may also be referred to as low-level features. As a depth of the convolutional neural network model 200 increases, a deeper convolutional layer (for example, the layer 226) extracts more complex features, such as high-level semantic features. Higher-level semantic features are more applicable to a problem to be resolved.

Pooling Layer:

Because a quantity of training parameters usually needs to be reduced, a pooling layer usually needs to be periodically introduced after a convolutional layer. For the layers 221 to 226 in the layer 220 shown in FIG. 1, one convolutional layer may be followed by one pooling layer, or a plurality of convolutional layers may be followed by one or more pooling layers. During image processing, the pooling layer is only used to reduce a space size of the image. The pooling layer may include an average pooling operator and/or a maximum pooling operator, to perform sampling on the input image to obtain an image with a relatively small size. The average pooling operator may be used to calculate pixel values in the image in a range, to generate an average value. The average value is used as an average pooling result. The maximum pooling operator may be used to select a pixel with a maximum value in a range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

Neural Network Model Layer 230:

After processing is performed by the convolutional layer/pooling layer 220, the convolutional neural network model 200 still cannot output required output information. As described above, at the convolutional layer/pooling layer 220, only a feature is extracted, and parameters resulting from an input image are reduced. However, to generate final output information (required class information or other related information), the convolutional neural network model 200 needs to use the neural network model layer 230 to generate an output of one required class or outputs of a group of required classes. Therefore, the neural network model layer 230 may include a plurality of hidden layers (231, 232, . . . , and 23*n* shown in FIG. 1) and an output layer 240. Parameters included in the plurality of hidden layers may be obtained through pre-training based on related training data of a task type. For example, the task types may include image recognition, image categorization, and super-resolution image reconstruction.

At the neural network model layer 230, the plurality of hidden layers is followed by the output layer 240, that is, the last layer of the entire convolutional neural network model 200. The output layer 240 has a loss function similar to a categorical cross entropy, and the loss function is configured to calculate a prediction error. Once forward propagation (for example, propagation in a direction from 210 to 240 in FIG. 1) of the entire convolutional neural network model 200 is completed, back propagation (for example, propagation in a direction from 240 to 210 in FIG. 1) is started to update a weight value and a deviation of each layer mentioned above, to reduce a loss of the convolutional neural network model 200 and an error between a result output by the convolutional neural network model 200 by using the output layer and an ideal result.

It should be noted that the convolutional neural network model 200 shown in FIG. 2 is merely an example of a convolutional neural network model. During application, the convolutional neural network model may alternatively exist in a form of another network model. The CNN network is widely used in the field of computer vision and has been successful in a plurality of practical applications such as picture classification, object detection, and semantic segmentation. To obtain higher classification accuracy, the CNN network usually has a large quantity of redundant parameters. A plurality of studies has proved that these redundant parameters can be removed without affecting classification performance of the network. In addition, to apply the CNN network to a terminal device having a limited operational capability such as a smartphone, it is needed to compress and accelerate the existing CNN network. Considering that a large quantity of computing resources exists at the cloud end, we can provide a cloud model compression service for the user.

A CNN network compression and acceleration technology, for example, a method such as knowledge distillation (KD), pruning of similar neurons, weight discretization, or hashing, may be used to compress the neural network model to provide a model compression and acceleration service at the cloud end for the user.

FIG. 3 is a schematic diagram of a neural network model compression method.

The training data is input into the teacher network model and the student network model, and a cross entropy loss, that is, a loss function $L_{KD}$ of a KD algorithm, is determined based on an output of the teacher network model and an output of the student network model. The loss function $L_{KD}$ of the KD algorithm can be used to measure a similarity between a processing result of the training data in the teacher network model and a processing result of the training data in the student network model. A parameter of the student network model is adjusted to minimize the loss function $L_{KD}$ of the KD algorithm:

$$L_{KD} = \frac{1}{n}\sum_i L_c(y_i^{te}, y_i^{st}),$$

where n is an amount of training data, $$y_i^{te}$$

and $$y_i^{st}$$

are respectively an output of the teacher network model and an output of the student network model after an input $x_i$ is given, and $$L_c(y_i^{te}, y_i^{st})$$

is a training loss of an $i^{th}$ piece of data in the training data.

The KD algorithm may also be referred to as a CNN model compression and acceleration algorithm. The loss function $L_{KD}$ is minimized by adjusting the parameter of the student network model, that is, the output of the student network model is consistent with the output of the teacher network model as much as possible. In this way, the student network model learns related features of the teacher network model.

The teacher network model is obtained based on original training data, and the output of the teacher network model for the original training data is relatively accurate. The student network model can be trained based on the original training data.

During training of the student network model, all the training data required for training the teacher network model needs to be obtained, so that a compressed network can have good classification performance. However, in comparison with the teacher network model, a file of the training data is very large in size. For example, a ResNet-50 network occupies only 95 MB space to store model parameters, but a training data set (image net) required for training the ResNet-50 network has more than 1.2 million training pictures and requires space of more than 120 GB for storage. Therefore, when a transmission speed is limited, the user needs to spend a long time in uploading the training data to the cloud end. Providing massive training data can achieve a relatively good network convergence result. However, uploading massive data to the cloud end by the user is time-consuming, and causes poor user experience.

The teacher network model can obtain a relatively accurate output result for pictures that are of a same class as the original data. The student network model is trained by using the pictures that are of the same class as the original data. In this way, the teacher network model can be effectively used to obtain a relatively accurate student network model.

For a manner of obtaining images having a same class distribution as original training data, refer to Data-Free Learning of Student Networks (Chen H, Wang Y, Xu C, et al. 2019), where the images are generated by using a generative adversarial network.

The generative adversarial network (GAN) is a deep learning model. The model includes at least two modules. One module is a generative model (generative model), and the other module is a discriminative model. The two modules are mutually adversarial and learn from each other to generate a better output. A basic principle of the GAN is as follows: A GAN for generating an image is used as an example. It is assumed that there are two networks: G (generator) and D (discriminator). G is a network for generating an image. G receives random noise z, and generates an image based on the noise, where the image is denoted as G(z). D is a discriminative network and used to determine whether an image is "real". In an ideal state, G may generate a picture G(z) that is to be difficultly distinguished from a real picture, and it is difficult for D to determine whether the picture generated by G is real, D(G(z))=0.5. In this way, an excellent generative model G is obtained, and can be used to generate a picture.

The teacher network model is used as a discriminative model. The generative model generates a group of images based on random signals and inputs these images into the teacher network model to obtain classes of these images. For example, an output of the teacher network model is a probability that a picture belongs to each class, and a sum of probabilities that the picture belongs to all classes is 1.

The teacher network model can process an image of a class only. If an image that does not belong to a class that can be processed by the teacher network model is input into the teacher network model, an output result of the teacher network model is still a probability that the image belongs to all classes that can be processed by the teacher network model.

If a probability that an image belongs to a class is higher than a preset value, it is considered that the image belongs to the class. If the preset value is relatively high, the probability that the image belongs to the class is relatively high, and a probability that an image that does not belong to the class is classified to the class is relatively low. However, a plurality of images that belong to the class are considered as not belonging to the class because the teacher network model determines that a probability that the images belong to the class is lower than the preset value. In other words, if the preset value is relatively high, obtained images used to train the student network model are only a part of images that can be processed by the teacher network model, and the student network model trained by using these images cannot reflect all performance of the teacher network model.

If the preset value is relatively low, the probability that the image belongs to the class is relatively low, and a probability that an image that does not belong to the class is classified to the class is relatively high. If an image that cannot be processed by the teacher network model is used to train the student network model, a student network model that can process an image of a class cannot be accurately obtained.

Therefore, when a processing result of the teacher network model for an image is used to determine whether the image belongs to a class that can be processed by the teacher network model, a determining result is not accurate, and this has adverse impact on training of the student network model. Therefore, an effect of the compressed neural network model is not satisfactory.

Figure 4:
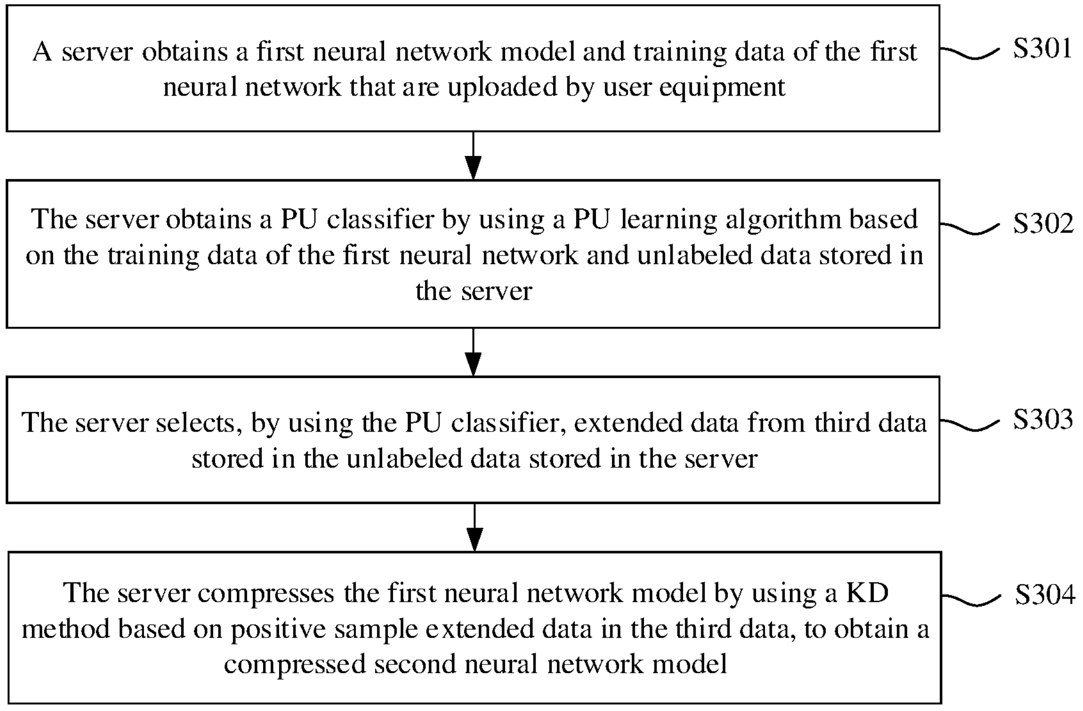
FIG. 4 is a schematic flowchart of a neural network model compression method according to an embodiment.

FIG. 4 is a schematic flowchart of a neural network model compression method according to an embodiment.

Step S301: A server obtains a first neural network model and training data of the first neural network that are uploaded by user equipment.

The training data of the first neural network may also be referred to as first data. The first data includes a part or all of the training data of the first neural network model.

The user equipment uploads the part of training data used to train the first neural network model, to reduce an amount of uploaded data and improve user experience.

The part of training data includes data of each of a plurality of classes output by the first neural network.

The first neural network model is configured to classify input data into at least one of N classes. The first data may include data of each of the N classes. In other words, the first data may include data of each of classes that can be processed by the first neural network model. The first neural network model is a neural network model that needs to be compressed. The first neural network model may be used for data classification. The first data may include data of each of classes to which all data used to train the first neural network model belongs. In this embodiment, positive sample data belongs to a class that can be processed by the first neural network model.

The training data of the first neural network model uploaded by the user includes data of each of a plurality of classes that can be processed by the first neural network, so that a second neural network obtained through training can process data of the plurality of classes, to improve accuracy of compressing the first neural network model.

The first neural network model can classify the input data. For example, the first neural network model may classify texts, speeches, images, features, and the like, for example, may classify a part-of-speech (noun, verb, . . . ) of each word in an input sentence, or may determine, based on an input speech segment, a mood of a person when the person is speaking, or may determine a class of a person or an object in an input picture for the picture, or classify an extracted feature.

Step S302: The server obtains a positive-unlabeled (PU) classifier by using a PU learning algorithm based on the training data of the first neural network and unlabeled data stored in the server.

Data having a property and distribution similar to a property and distribution of the training data of the first neural network model may be referred to as positive data or positive sample data. The first neural network model may be configured to process the positive sample data. The first data is the positive sample data. The data having the property and distribution similar to the property and distribution of the training data of the first neural network model may be referred to as the positive sample data.

The unlabeled data stored in the server may also be referred to as second data. The second data may include the positive sample data and data other than the positive sample data, that is, negative sample data. The unlabeled data means that it is uncertain whether the data is the positive sample data.

Figure 9:
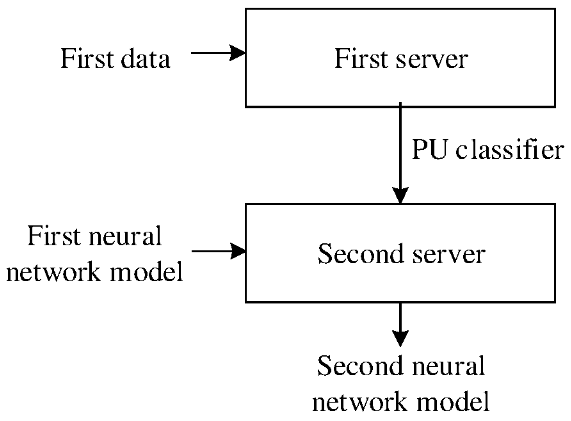
FIG. 9 is a schematic flowchart of a neural network model compression method according to still another embodiment.

The server obtains the PU classifier. The server may receive the PU classifier sent by the user equipment or another server. The server may also obtain the PU classifier from a memory. Referring to FIG. 9, training of the PU classifier may be performed by another apparatus. Training of the PU classifier may also be performed by a server compressing the first neural network model.

The server may train the PU classifier based on the first data, the second data, and proportion information of the positive sample data in the second data.

The server may train the PU classifier by using the PU learning algorithm. A loss function of the PU learning algorithm may be an expectation of a training loss of the first data and the second data, and the proportion information is used to calculate the expectation.

The server may obtain the proportion information of the positive sample data in the second data, where the proportion may also be referred to as prior probability information and is used to indicate a proportion of the positive sample data in the second data.

The PU learning algorithm provides a semi-supervised learning mode in which the server can classify the unlabeled data based on labeled positive sample data and determine the positive sample data and negative sample data in the unlabeled data. The positive sample data may be data that can be processed by the first neural network model, and the negative sample data is data other than the data that can be processed by the first neural network model. The positive sample data belongs to a class that can be processed by the first neural network model, and the negative sample data does not belong to a class that can be processed by the first neural network model.

By using the PU learning algorithm, the server may input the first data and the second data into the to-be-trained PU classifier, and adjust a parameter of the to-be-trained PU classifier, so that a classification result of the PU classifier for the second data satisfies the proportion information of the positive sample data in the second data and that the adjusted PU classifier is obtained. The adjusted PU classifier is a PU classifier obtained through training. For a principle of the PU learning algorithm, refer to the description of FIG. 6.

Step S303: The server selects, by using the PU classifier, extended data from the unlabeled data stored in the server.

The extended data is data having a property and distribution similar to the property and distribution of the training data of the first neural network model, that is, the extended data is the positive data.

The unlabeled data used to obtain the extended data may be the same as the unlabeled data used to train the PU classifier. The unlabeled data used to obtain the extended data may also include data different from the unlabeled data used to train the PU classifier. The unlabeled data used to obtain the extended data may be referred to as third data. The third data may include a part or all of the second data or may be other data than the second data. An amount of data stored in the server is limited. By inputting same data into the PU classifier to train the PU classifier and use the PU classifier, an amount of data used to train the second neural network can be increased, and accuracy of training the second neural network is improved.

The third data is input into the PU classifier. The PU classifier classifies the third data to determine positive sample data and negative sample data in the third data. The extended data is the positive sample data in the third data.

The PU classifier may classify data and data features. An object classified by the PU classifier is related to a training process of the PU classifier.

The first data and the second data may be input into a to-be-trained feature extraction network to obtain a first feature. The feature extraction network may be used to perform feature extraction on the input data to obtain the first feature. The first feature is input into the to-be-trained PU classifier. Parameters of the to-be-trained feature extraction network and the to-be-trained PU classifier are adjusted based on the proportion information of the positive sample data in the second data and the extracted first feature, so that the feature extraction network and the PU classifier are obtained.

The first feature includes a feature of each piece of data in the first data and a feature of each piece of data in the second data that are extracted by the feature extraction network.

The positive sample data, that is, the extended data, in the stored third data may be determined based on the PU classifier. The third data may be input into the feature extraction network to obtain a second feature. The second feature may be input into the PU classifier to determine the extended data.

The first feature may be obtained by fusing a plurality of third features output by a plurality of layers of the feature extraction network. The plurality of third features is in a one-to-one correspondence with the plurality of layers of the feature extraction network. A first weight adjustment is performed based on the proportion information.

The third feature includes a feature of each piece of data in the first data and a feature of each piece of data in the second data that are extracted by the feature extraction network.

The feature extraction network may be a CNN network.

The feature extraction network has a plurality of parameters. Therefore, a lot of data is required for adjusting parameters of the feature extraction network, and the adjustment takes a long time.

The first neural network may be used as the feature extraction network. The first data and the second data may be input into the first neural network model to extract a plurality of third features output by a plurality of layers of the first neural network model, and the plurality of third features are fused to obtain the first feature. The PU classifier is obtained based on the first feature and the proportion information of the positive sample data in the second data.

In other words, the PU classifier is obtained based on the first feature and the proportion information of the positive sample data in the second data. The first feature is obtained based on fusion of the plurality of third features. The plurality of third features is obtained by performing feature extraction on the first data and the second data by using the first neural network model. The plurality of third features is in a one-to-one correspondence with the plurality of layers of the first neural network.

Feature extraction may be performed on the third data by using the first neural network model, to obtain the second feature. The second feature is obtained by fusing a plurality of fourth features by using a first weight. The plurality of fourth features is in a one-to-one correspondence with the plurality of layers of the first neural network. The second feature is input into the PU classifier to determine the extended data.

The first neural network model is a neural network model obtained through training, and is configured to process the positive sample data, so that features effective for classification of the positive sample data can be extracted. The first neural network model may be used as the feature extraction network, so that a quantity of parameters that need to be adjusted in the PU learning algorithm can be reduced and that efficiency of obtaining positive sample data from unlabeled data stored at a cloud end can be improved.

By using the positive-unlabeled PU learning algorithm, the PU classifier may be trained based on the features output by the first neural network model.

Data such as texts and images are classified, and features of the data may be extracted by the feature extraction network. Because the first neural network model is used as the feature extraction network, the feature extraction network does not need to be trained again, thereby reducing time for classifying unlabeled data, and improving extraction efficiency.

A plurality of features is output by the plurality of layers of the feature extraction network. The plurality of features output by the plurality of layers of the feature extraction network may be fused, and a fusion result is input into the PU classifier. The features output by the plurality of layers of the feature extraction network may be input into the PU classifier by using a same weight. Weights of the features of the plurality of layers may also be adjusted by using a multi-feature network with an attention mechanism.

The first feature is obtained by fusing the plurality of third features that undergo the first weight adjustment, and the first weight adjustment is performed based on the proportion information of the positive sample data in the second data. The plurality of third features is in a one-to-one correspondence with the plurality of layers of the feature extraction network.

In other words, the plurality of third features may be fused, and the feature obtained through fusion is input into the to-be-trained PU classifier. A weight of each third feature in the plurality of third features is adjusted, and the parameter of the to-be-trained PU classifier is adjusted, so that a classification result of the PU classifier satisfies the proportion information of the positive sample data in the second data. In other words, the first weight is determined based on the proportion information of the positive sample data in the second data, and the PU classifier is obtained.

The extended data is input into the feature extraction network, and a plurality of fourth features are output by the plurality of layers of the feature extraction network. Based on the first weight, the plurality of fourth features output by the plurality of layers of the feature extraction network are fused. The plurality of fourth features is in a one-to-one correspondence with the plurality of layers of the feature extraction network.

A correspondence between the third features and the layers of the feature extraction network is the same as a correspondence between the fourth features and the layers of the feature extraction network. In other words, outputs of the plurality of layers of the feature extraction network are in a one-to-one correspondence with a plurality of weight values of the first weight.

There is a plurality of fusion manners.

One fusion manner is combining. Fusion in the combining manner may be used to perform direct addition or weighted addition on to-be-fused features. Weighted addition is to multiply by a coefficient, that is, a weight value, and then perform addition. In other words, in the combining manner, channel-wise linear combining may be performed.

The plurality of features output by the plurality of layers of the feature extraction network may be added. For example, the plurality of features output by the plurality of layers of the feature extraction network may be directly added, or the plurality of features output by the plurality of layers of the feature extraction network may be added based on a weight. T1 and T2 respectively represent features output by two layers of the feature extraction network, and T3 may be used to represent a feature obtained through fusion, where $T3=a\times T1+b\times T2$, a and b are respectively coefficients by which T1 and T2 are multiplied when T3 is calculated, that is, weight values, $a\neq 0$, and $b\neq 0$.

Another fusion manner is concatenation & channel fusion. In the concatenation & channel fusion manner, dimensions of to-be-fused features may be directly concatenated, or concatenated by multiplying a coefficient, that is, a weight value.

Figure 7:
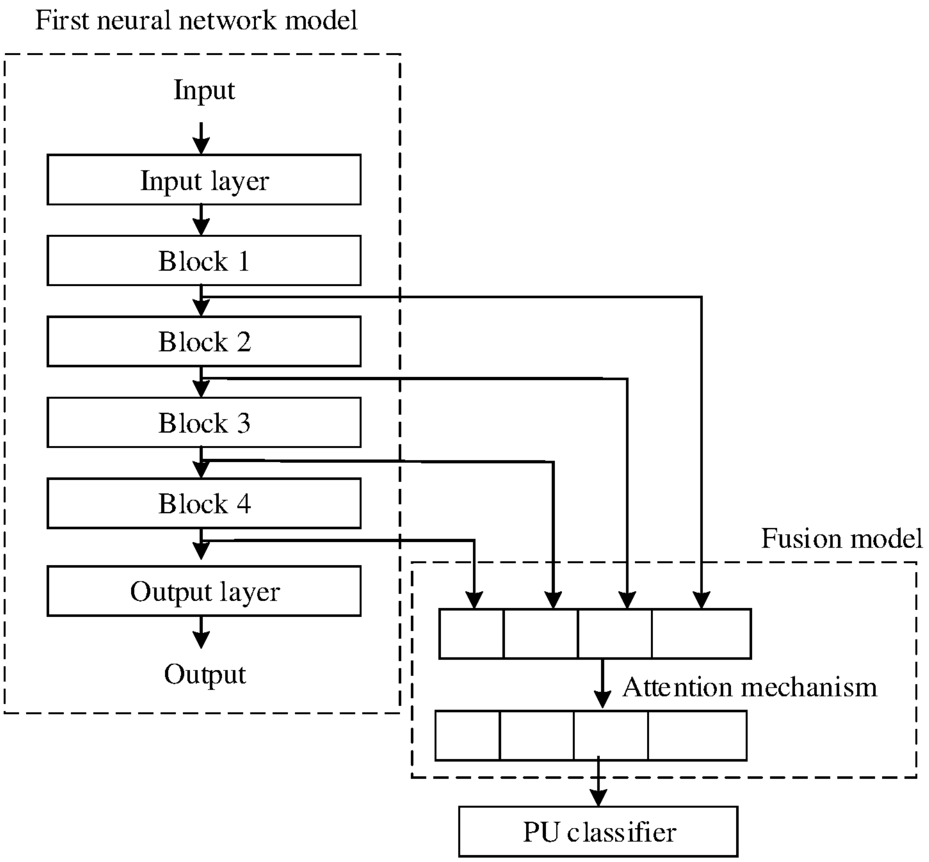
FIG. 7 is a schematic diagram of a multi-feature fusion model with an attention mechanism according to an embodiment.

An example in which the feature extraction network is the first neural network model is used for description. The multi-feature network with the attention mechanism may be added to the first neural network model to obtain a third neural network model. The multi-feature network with the attention mechanism uses the attention mechanism to select a plurality of features output by different layers of the first neural network model. The labeled data and the unlabeled data are input into the third neural network model, and the positive sample data is obtained by using the PU learning algorithm. FIG. 7 shows a feature fusion manner.

By using the multi-feature network with the attention mechanism, the features extracted by different layers of the first neural network model are selected to improve accuracy of classification for unclassified data.

In the training process of the PU classifier, parameters of the multi-feature network and the PU classifier may be adjusted. Therefore, a relatively accurate PU classifier is obtained, and the extended data is accurately selected from the third data. In other words, the parameters of the multi-feature network and the PU classifier may be adjusted in a semi-supervised learning process.

Step S304: The server trains a second neural network model by using a KD method based on the extended data.

The first neural network model is used as a teacher network model of the KD method and the second neural network model is used as a student network model of the KD method. The KD method may also be referred to as a KD algorithm.

The server may further train the second neural network model by using the knowledge distillation (KD) method based on the extended data and the training data of the first neural network that are uploaded by the user.

The training data of the first neural network is used as training data used to train the second neural network model, to increase an amount of training data, and improve accuracy of the second neural network model obtained through training.

The extended data may include a plurality of classes that can be processed by the first neural network model. An amount of data of each class may vary greatly.

The extended data is input into the first neural network model and the second neural network model, and a parameter of the second neural network model is adjusted based on a loss function of the KD method, so that the loss function satisfies a preset condition. For example, the parameter of the second neural network model is adjusted to minimize the loss function of the KD method. The adjusted second neural network model is a result of compressing the first neural network model.

The first neural network classifies the training data into N data classes, where N is a positive integer, and a second weight of each piece of data of a first data class in the N data classes in the loss functions of the first neural network model and the original neural network model is in negative correlation with an amount of data of the first class.

If the second weight of each piece of data in the loss function of the KD method is equal, the following case may occur: There is little data of a class corresponding to a classification result of the first neural network model, and for the data of the class, there is a great difference between an output of the first neural network model and an output of the second neural network model obtained through training, but the loss function satisfies a preset requirement. In this case, the second neural network model obtained through training cannot effectively process data of the class, and the classification is inaccurate, that is, a compression result of the first neural network model is inaccurate.

During compression of the first neural network model based on the extended data, an amount of data of each class in the positive sample data in the labeled data and the unlabeled data may be considered. The loss function is adjusted, so that second weights of extended data of various classes in the loss function are in negative correlation with amounts of data of different classes in the third data. The loss function of the KD method is adjusted, so that the compressed neural network model, that is, the second neural network model obtained through training, can be similar to the first neural network model for the data of each class, thereby achieving a relatively good compression effect for the first neural network model.

The extended data is input into the first neural network model, to classify the extended data and obtain extended data of a plurality of classes and a second weight of extended data of each of the plurality of classes. The server minimizes the loss function of the KD algorithm to obtain the trained second neural network model.

The server obtains the trained second neural network model by using the knowledge distillation (KD) method based on the third data and the first neural network model, where the loss function of the KD method is a sum of products of training errors of extended data of all of the plurality of classes and second weights of the extended data of all the classes.

A training error of the extended data of each class may be understood as a sum of training errors of all data in the extended data of the class.

Based on an amount of positive sample data in the unlabeled data in the classes that can be processed by the first neural network model, a second weight corresponding to data of each class in the loss function of the KD method is adjusted, and when distributions of the positive sample data in different classes are unbalanced, the compressed neural network model can obtain a relatively good classification result for the data of each class.

Because data classification by the first neural network model may be inaccurate, the first neural network model has an error in a data classification result. Therefore, the second weights of different classes in the loss function can be randomly perturbed. The parameter of the second neural network model is adjusted, so that the loss function satisfies a preset condition in different perturbation cases. The adjusted second neural network model is the compressed neural network model.

The extended data is input into the first neural network model and the second neural network model. The first neural network classifies the third data to obtain extended data of N classes, where N is a positive integer, and a second weight of extended data of each of the N classes in the loss function of the KD method is in negative correlation with an amount of extended data of each class; random perturbation is performed on the second weight corresponding to the extended data of each class in the loss function of the KD method; and the parameter of the second neural network model is adjusted, so that the loss function satisfies a preset condition in different perturbation cases and that the adjusted second neural network model is obtained.

The second weights of the extended data of all the classes include a plurality of perturbed weights obtained after random perturbation is performed on initial weights of the extended data of all the classes, and the loss function of the KD method includes a plurality of loss functions in a one-to-one correspondence with the plurality of perturbed weights. An initial weight of the extended data of each class is in negative correlation with an amount of the extended data of each class. Maximum values of the plurality of loss functions are minimized, so that the trained second neural network model is obtained. The trained second neural network model makes the maximum values of the plurality of loss functions minimized. For determining and perturbation of the second weights in the loss function, refer to the description of FIG. 8.

Random perturbation is performed on the initial weights in the loss function of the KD method, and the perturbed weights randomly fluctuate around values that are in negative correlation with amounts of data of different classes in the labeled data and the positive sample data, so that the loss function satisfies the preset condition in a case of a plurality of perturbed weights. The adjusted original neural network model that makes the maximum values of the plurality of loss functions minimized is used as the compressed second neural network model. Therefore, adverse impact of an error in the classification result of the first neural network model on accuracy of the compressed neural network model is reduced, and accuracy of the compressed neural network model for the data classification result is improved.

In steps S301 to S304, the PU classifier is used to classify, based on the training data of the first neural network uploaded by the user, the unlabeled data stored in the server, to obtain, from the unlabeled data stored at the cloud end, the extended data that can be processed by the first neural network model, that is, data having a property and distribution similar to the property and distribution of the training data of the first neural network model. Based on the extended data, neural network model compression can be implemented, thereby reducing a requirement of the neural network model compression on an amount of labeled data, reducing an amount of data to be transmitted while ensuring accuracy of the neural network model compression, and improving user experience.

Figure 5:
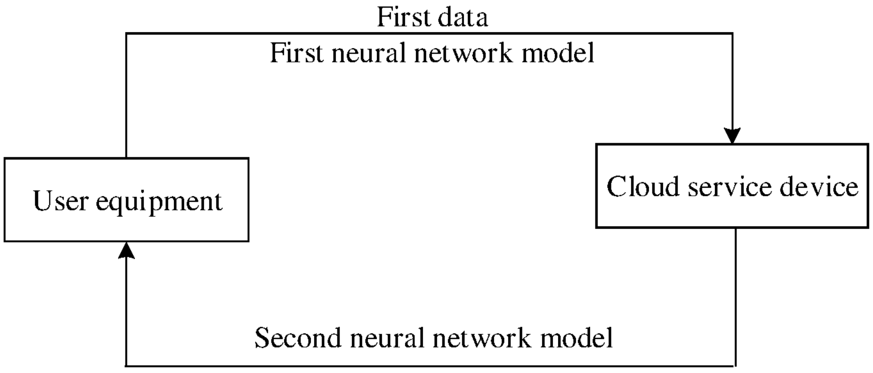
FIG. 5 is a schematic flowchart of a neural network model compression method according to another embodiment.

FIG. 5 is a schematic diagram of a neural network model compression method according to an embodiment. A neural network model for image classification is used as an example for description.

User equipment sends first data and a first neural network model to a cloud service device. The cloud service device may also be referred to as a cloud server or a server. Sending the first neural network model may also be understood as sending a parameter of the first neural network model. The cloud service device may use the first neural network model as a teacher network model and compress the first neural network model. The first neural network model is configured to process positive sample data. The first neural network model is capable of determining a class of each image in the first data. The first data may be a part of original training data of the first neural network model. The first data may be labeled data and the first data may be positive sample data.

The first data may include at least one image of each class in the original training data of the first neural network model. The first neural network model is configured to classify input data into at least one of N classes, where N is a positive integer. The first data includes data of each of the N classes.

The cloud service device uses the first neural network model as the teacher network model based on the first data and the first neural network model that are sent by the user equipment and cloud data stored in the cloud service device, and compresses the first neural network model, to obtain a compressed second neural network model. The cloud data is data stored at a cloud end and includes at least one image.

The cloud service device trains, based on the first data uploaded by the user equipment and the cloud data, a PU classifier corresponding to the first neural network model.

The cloud service device may compress the first neural network based on positive sample data in the cloud data. The cloud service device uses the PU classifier to determine the positive sample data in the cloud data.

The cloud service device may compress the first neural network model by using a KD method. The cloud service device may use the first neural network model as the teacher network model and train a student network model by using the KD method. The cloud service device may use the trained student network model as the compressed second neural network model. The student network model before training may also be referred to as an original neural network model or an original model.

The cloud service device inputs the positive sample data in the cloud data into the first neural network model and the student network model and determines a loss function $L_{KD}$ of the KD method based on outputs of the first neural network model and the student network model. The loss function $L_{KD}$ of the KD method may be expressed as:

$$L_{KD} = \frac{1}{n}\sum_i L_c(y_i^{te}, y_i^{st}),$$

where n is an amount of the positive sample data in the cloud data, $$y_i^{te}$$

and $$y_i^{st}$$

are respectively the outputs that are of the first neural network model and the student network model and corresponding to an $i^{th}$ piece of data in the positive sample data in the cloud data, and $$L_c(y_i^{te}, y_i^{st})$$

is a training loss of the $i^{th}$ piece of data in the training data, that is, a cross entropy loss between $$y_i^{te}$$

and $$y_i^{st}.$$

A value range of the output of the first neural network model may be from negative infinity to positive infinity. Value ranges of output results of the first neural network model and the student network model may be adjusted in the same manner, to reduce bit widths of the output results and reduce a calculation amount for calculating the cross entropy loss. For example, the outputs of the first neural network model and the student network model may be normalized by performing a softmax transformation. Normalization is to adjust an output result between 0 and 1. Referring to Distilling the Knowledge in a Neural Network (Hinton G, Vinyals O, Dean J. Computer Science, 2015, 14(7):38-39), the outputs of the first neural network model and the student network model may be divided by a same temperature parameter and transformed by using a normalized exponential function softmax, to obtain soft probabilities. The loss function of the KD method is calculated based on distributions of the two soft probabilities. The distribution of the output result may be adjusted between 0 and 1 based on the temperature parameter.

The cloud service device may minimize the loss function $L_{KD}$ of the KD method by adjusting the student network model, to obtain an adjusted student network model. The adjusted student network model is the second neural network model.

The cloud service device may send the compressed second neural network model to the user equipment.

The user equipment processes the image based on the compressed neural network model, to reduce processing time, reduce resource occupation, and improve processing efficiency.

Figure 8:
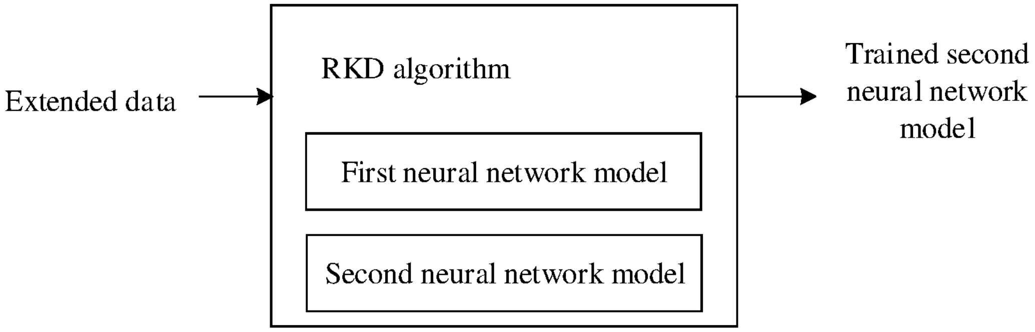
FIG. 8 is a schematic diagram of a knowledge distillation method according to an embodiment.

The first neural network model classifies the positive sample data in the cloud data. In a plurality of classes in a classification result, a quantity of images of one class may be small, but a quantity of images of another class may be relatively large. For the minimized loss function of the KD method, if an amount of data of one of the plurality of classes in the classification result is small, and for the data of this class, there is a great difference between an output of the second neural network model and an output of the first neural network model, the second neural network model cannot effectively process the data of this class, and accuracy of neural network compression is relatively low. Referring to FIG. 8, the loss function of the KD method may be adjusted to obtain a robust knowledge distillation method.

Figure 6:
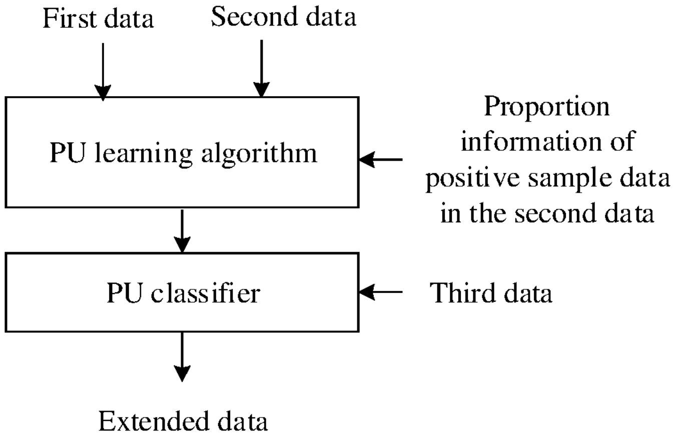
FIG. 6 is a schematic flowchart of a method for extending positive sample data according to an embodiment.

FIG. 6 is a schematic diagram of a method for extending positive sample data according to an embodiment.

An image belonging to an original training data class is positive sample data. An image not belonging to the original training data class is negative sample data. The positive sample data may be used to compress a first neural network model to obtain a second neural network model. The first neural network model is a teacher network model, and the second neural network model is a student network model. Compressing the first neural network model to obtain the second neural network model may be understood as training the second neural network model. Therefore, the first neural network model may also be referred to as a pre-trained network model.

A cloud service device obtains first data. The first data includes at least one image, and each of the at least one image is positive sample data. The first data may include an image of each of classes to which all images for training the first neural network model belong. The first data may be a part of original training data of the first neural network model.

The cloud service device extends the positive sample data based on the first data, the first neural network model, and second data. The second data is massive cloud unlabeled data, and the second data includes a plurality of images.

By using a PU learning algorithm, semi-supervised learning is performed based on the first data, the second data, and proportion information of positive sample data in the second data, and a PU classifier is generated through the learning process to label the massive unlabeled data. Training data of the positive-unlabeled (PU) classifier includes the first data, the second data, and the proportion information of the positive sample data in the second data. The first data is the positive sample data, and the second data is the unlabeled data. Bayesian decision theory uses a misclassification loss to select an optimal class when a correlation probability is known.

The first data and the second data are input into the first neural network model. The first neural network model performs feature extraction on each image in the first data and the second data. The to-be-trained PU classifier classifies the images based on features extracted by the first neural network model and classifies the input images into positive sample data or negative sample data.

A parameter of the PU classifier may be adjusted based on the proportion information of the positive sample data in the second data, to ensure accuracy of an output result. A loss function of the PU learning algorithm may be determined based on the proportional information of the positive sample data in the second data. In other words, the parameter of the PU classifier may be adjusted based on the loss function of the PU learning algorithm.

A label of each image in the first data is positive sample data. It is assumed that a label of each image in the unlabeled data is negative sample data.

$x_i$ is a training sample of the PU classifier, and $x_i \in X \subset R^d$, where X denotes a set of training samples of $x_i$, and $R^d$ denotes a representation of the image. $y_i$ is a label corresponding to $x_i$. For example, $y_i \in Y=\{-1,1\}$, where Y denotes a label set, "+1" denotes positive sample data, and "−1" denotes negative sample data. $x_i \in$ ET, where T denotes a set of training samples, and T may be expressed as:

$$T = L \cup U = \{(x_l, +1)\}_{l=1}^{n_l} \cup \{(x_u, y_u)\}_{u=1}^{n_u}.$$

L is a labeled data set, that is, the first data; U is an unlabeled data set, that is, the second data; $n_l$ is an amount of the first data; and $n_u$ is an amount of the second data. All the first data is positive sample data and has a label "+1". A label of unlabeled data in the second data may be denoted as $y_u$, and $y_u \in Y=\{-1,1\}$, that is, $y_u$ is a real label of the unlabeled data.

A decision function $f$ and a discriminative function F are defined. The decision function $f$ is used to indicate a relationship between an input image $x_i$ and an output $z_i$ of the PU classifier, that is, $f: x_i \rightarrow z_i$. The label $y_i$ corresponding to the image $x_i$ may be determined based on the output $z_i$ of the PU classifier. For example, a correspondence between $y_i$ and $z_i$ may be: when $z_i>0$, $y_i=1$; or when $z_i \leq 0$, $y_i=-1$. The discriminative function F is used to indicate a relationship between the input image $x_i$ and the label $y_i$, that is, $F: x_i \rightarrow y_i$.

For a conventional binary classification problem, considering proportions of positive sample data and negative sample data in the training data, the loss function may be expressed as an expectation (mean) of the training loss of the training data. The expectation may also be known as a mathematical expectation and is a sum of all possible results multiplied by probabilities thereof in an experiment. An output of a binary classifier may be adjusted by using the following loss function:

$$R_{pn}(f) = \pi_p R_p^+(f) + \pi_n R_n^-(f).$$

$$R_p^+(f)$$

denotes a loss caused by the conventional binary classifier by classifying positive sample data in the training data into negative sample data, $$R_n^-(f)$$

denotes a loss caused by the conventional binary classifier by classifying negative sample data in the training data into positive sample data, $\pi_p$ denotes a prior probability of the positive sample data, $\pi_n$ denotes a prior probability of the negative sample data, and $\pi_p$ and $\pi_n$ have the following relationship:

$$\pi_p + \pi_n = 1.$$

In the conventional binary classification, if the training data is randomly selected from natural data, a proportion of the positive sample data in the training data may be used to represent the prior probability of the positive sample data, and a proportion of the negative sample data may be used to represent the prior probability of the negative sample data. In other words, $\pi_p$ and $\pi_n$ may be statistical probabilities. Additionally, $\pi_p$ and $\pi_n$ may also be obtained by estimating a proportion of positive data in the second data.

In the data input into the PU classifier, we assume that the second data, that is, the unlabeled data, is randomly selected from the natural data. Therefore, we can estimate the proportion of the positive sample data in the unlabeled data, and this proportion may also be referred to as the prior probability of the positive sample data, denoted as $\pi_p$. However, because there is no labeled negative sample data in the data input into the PU classifier, a second term in the expression $R_{pn}(f)$ cannot be directly obtained.

The PU classifier may also classify images based on features extracted from the images. A probability of classifying the positive sample data in the second data into negative sample data by the PU classifier is the same as a probability of classifying the positive sample data in the first data into negative sample data by the PU classifier. "The same" may also be approximately the same.

All the first data is positive sample data. The label of the image in the first data, determined based on the output of the PU classifier, is compared with the label "+1", and a loss caused by the PU classifier to a classification result of the first data is determined. The label "+1" is a label of positive sample data.

Therefore, $$R_p^+(f)$$

may be expressed as:

$$R_p^+(f) = E_p[l(F(x), +1)],$$

where l is a loss function, l(F(x),+1) is used to determine a loss caused by a label of a piece of positive sample data obtained based on the PU classifier, $E_p$ is a risk function used to determine a loss caused by the PU classifier to an overall classification result of the first data, and $E_p$ may be a sum of losses caused by labels of all data in the first data obtained based on the PU classifier.

$R_x(f)$ is defined as a loss corresponding to the second data, that is, the unlabeled data. Assuming that the unlabeled data is negative sample data, when the PU classifier classifies an image in the unlabeled data into positive sample data, there is a loss. $R_x(f)$ denotes a loss caused by classifying an image in the unlabeled data into positive sample data by the PU classifier. The label of the unlabeled data, determined based on the output of the PU classifier, is compared with the label "−1", and the loss $R_x(f)$ caused by the classification of the unlabeled data by the PU classifier is determined. The label "−1" is a label of negative sample data.

$R_x(f)$ may be expressed as:

$$R_x(f) = E_x[l(F(x), -1)].$$

E is a risk function, used to determine the loss caused by the PU classifier to the overall classification result of the unlabeled data, and $E_x$ may be a sum of losses caused by labels of all images obtained based on the PU classifier. Subscripts p and x of $E_p$ and $E_x$ only denote sources of losses. $E_p$ and $E_x$ are calculated in the same way, that is, expressions of $E_p$ and $E_x$ may be the same.

The unlabeled data includes positive sample data and negative sample data. Therefore, $R_x(f)$ includes a loss caused by classifying positive sample data in the unlabeled data into positive sample data, and a loss caused by classifying negative sample data in the unlabeled data into positive sample data. $R_x(f)$ may be expressed as:

$$R_x(f) = \pi_p R_p^-(f) + \pi_n R_n^-(f).$$

Details are as follows:

$$R_p^-(f) = E_p[l(F(x), -1)].$$

$$R_p^-(f)$$

denotes a loss caused by classifying positive sample data in the unlabeled data into positive sample data by the PU classifier, and $$R_n^-(f)$$

denotes a loss caused by classifying negative sample data in the unlabeled data into positive sample data by the PU classifier. Negative sample data exists only in the unlabeled data. Therefore, the loss function $\tilde{R}_{pu}(f)$ of the PU algorithm may be expressed as:

$$\tilde{R}_{pu}(f) = \pi_p R_p^+(f) + \left(R_x(f) - \pi_p R_p^-(f)\right).$$

Considering that an error may exist between a proportion of positive sample data in an actual classification result and a proportion $\pi_p$ of positive sample data in unlabeled data in an actual situation, $$R_x(f) - \pi_p R_p^-(f)$$

may be less than 0, but $$\pi_n R_x^-(f) \geq 0. \ \tilde{R}_{pu}(f)$$

is adjusted to ensure that a value used to represent a term of $$\pi_n R_x^-(f)$$

is greater than 0, and the following is obtained:

$$\tilde{R}_{pu}(f) = \pi_p R_p^+(f) + \max\{0, R_x(f) - \pi_p R_p^-(f)\}.$$

The parameter of the PU classifier is adjusted based on the loss function $\tilde{R}_{pu}(f)$ of the PU algorithm, to change the decision function $f$.

In the $\tilde{R}_{pu}(f)$ expression, a first term may be represented by a classification loss of the decision function $f$ on the labeled data set L, and a second term may be represented by a classification loss of the decision function $f$ on the unlabeled data set U and a classification loss of the decision function $f$ on the labeled data set U. The first term may represent the classification loss of the decision function $f$ on the labeled data set L, and the second term may represent the classification loss of the decision function $f$ on the unlabeled data set U. A sum of the two terms is an overall loss of the decision function $f$ on the set T of training samples.

Assuming that 1 represents a distribution of real data, minimizing a loss of the decision function $f$ on T represents minimizing a loss of the decision function $f$ on the real data, and means that an optimal decision function $f$ is learned.

$\tilde{R}_{pu}(f)$ is minimized by adjusting the parameter of the PU classifier. The PU classifier is obtained by using the PU learning algorithm. Extended data in third data, that is, the positive sample data in the unlabeled data, may be determined based on the PU classifier, and the positive sample data is extended.

The extended data may be used as a part of training data for compressing the first neural network model.

FIG. 7 is a schematic diagram of a multi-feature fusion model with an attention mechanism according to an embodiment.

A PU classifier classifies, based on a feature extracted by a first neural network model, data input into the first neural network model. The feature extracted by the first neural network model may include an output of one or more layers of the first neural network model, for example, may be an output of a last layer, or may be a result of fusion or another transformation of outputs of a plurality of layers.

During training of the PU classifier, first data and second data may be input into the first neural network model. Features extracted by the plurality of layers of the first neural network model are input into the multi-feature model. The multi-feature model processes the features extracted by the plurality of layers of the first neural network model to obtain transformed features. The transformed features are input into the PU classifier. The PU classifier processes the fused features to obtain a label of an image.

$\tilde{R}_{pu}(f)$ is calculated based on an output of the PU classifier and proportion information of positive sample data in the second data. Parameters of the PU classifier and the multi-feature model are adjusted to reduce $\tilde{R}_{pu}(f)$, to complete training of the PU classifier.

There may be a plurality of fusion manners.

One fusion manner is combining. Fusion in the combining manner may be used to perform direct addition or weighted addition on to-be-fused features. Weighted addition is to multiply by a coefficient, that is, a weight value, and then perform addition. In other words, in the combining manner, channel-wise linear combining may be performed. Weight values by which the features are multiplied may be the same or different.

Another fusion manner is concatenation & channel fusion. In the concatenation & channel fusion manner, dimensions of to-be-fused features may be directly concatenated, or concatenated by multiplying a coefficient, that is, a weight value. Weight values by which the features are multiplied may be the same or different.

The features extracted by the plurality of layers may be adjusted by using the attention mechanism, and the adjusted features are used as an input of the PU classifier.

Parameters of the fusion model and the PU classifier are adjusted based on a label of each image in a set of training samples, so that $\tilde{R}_{pu}(f)$ is minimized. Adjusting the parameters of the fusion model and the PU classifier is adjusting a decision parameter $f$.

Global average pooling may be performed on outputs of the plurality of layers of the first neural network, to obtain a plurality of eigenvalues that are in a one-to-one correspondence with the outputs of the plurality of layers. The plurality of eigenvalues may be concatenated to obtain a feature descriptor o.

Pooling is also referred to as undersampling or downsampling. Pooling is used to reduce dimensions of features, compress an amount of data and a quantity of parameters, reduce overfitting, and improve fault tolerance of the model. Global average pooling is not averaging in a form of a window but averaging by using an output of one layer as a unit. In other words, an output of one layer is converted into a value. A calculation result of global average pooling is an average value of all points in an output matrix of one layer.

An attention change mechanism is performed on the feature descriptor o to obtain a corresponding feature o'.

For example, a weight parameter w of the feature descriptor o may be expressed as:

$$w = \text{Attention}\ (o, W) = \sigma(W_2\delta(W_1 o)).$$

δ and σ are nonlinear transformation functions, and $W_1$ and $W_2$ are two fully connected parameters. $W_1$ and $W_2$ are two parameter matrices obtained through machine learning, and a linear transformation is performed by using $W_1$ and $W_2$. δ, may be, for example, a rectified linear unit (ReLU).

By using a combination of linear and nonlinear transformations, the attention mechanism is used to select features. For given input data, the network outputs different features among a plurality of layers, where the features respectively represent expressions of original data at different layers. For example, when a picture of a car is input, features output by a lower layer of the network are basic features such as edge lines and contours, and features output by a higher layer of the network are features that are highly related to the image, such as a wheel and a license plate. Features of layers more important for an output result may be selected by using the attention mechanism.

For a $j^{th}$ eigenvalue $o_j$ in the feature descriptor, a weight parameter of the eigenvalue is $w_j$, and in an output of the multi-feature model, a field $o_j'$ corresponding to the eigenvalue $o_j$ is:

$$o_j' = w_j o_j.$$

A value of $w_j$ represents importance of a corresponding feature. A larger value of the parameter $w_j$ represents that the corresponding feature is more important.

FIG. 8 is a schematic diagram of a knowledge distillation method according to an embodiment.

The knowledge distillation method may be referred to as a robust knowledge distillation (RKD) method.

A PU classifier is used to classify third data to obtain extended data. There is a problem that an amount of the extended data is unbalanced. A first neural network model classifies the extended data. The extended data is data that is in unlabeled data stored in a server and has a property and distribution similar to a property and distribution of training data of the first neural network model. The extended data may include a part of cloud unlabeled data or may include training data of the first neural network model uploaded by user equipment. In the extended data, a quantity of images of one class may be small and a quantity of images of another class may be large. For a class with a small quantity of images, it should be ensured as much as possible that an output of a second neural network model is the same as an output of the first neural network model, so that the second neural network model better learns a related feature of the first neural network model, that is, the second neural network model and the first neural network model can implement more similar functions.

For example, for three images among 5005 training images of extended positive sample data, an output of the second neural network model obtained through training is different from a classification result of the first neural network model, but for other images, an output of the second neural network model obtained through training is the same as a classification result of the first neural network model. Among the 5005 training images, 5 images belong to a first class, and 5000 images belong to a second class. If the three images all belong to the first class, 60% of results of the second neural network model obtained through training for the images of the first class are different from classification results of the first neural network model, related features of the second neural network model obtained through training differ greatly from those of the first neural network model, and accuracy of classification of the images of the first class is relatively low, that is, accuracy of neural network model compression is relatively low. If the three images all belong to the second class, 0.06% of results of the second neural network model obtained through training for the images of the second class are different from classification results of the first neural network model, related features of the second neural network model obtained through training differ very slightly from those of the first neural network model, and accuracy of neural network model compression is relatively high.

To resolve the problem that neural network model compression is inaccurate due to an imbalance of positive sample data in different classes, the first neural network model may be used to classify the extended data. Based on the classification result, a weight adjustment may be performed on data in a loss function of the KD method, so that a weight corresponding to each piece of data in a class with a smaller data amount is larger, that is, a weight $$w_{kd}^{k}$$

of a $k^{th}$ class in the loss function of the KD method is in negative correlation with amounts of data of different classes in the labeled data and the positive sample data.

In addition, in a class with a relatively large data amount, a small increase or decrease of the data amount has little adverse impact on accuracy of neural network model compression. However, in a class with a relatively small data amount, a small increase or decrease of the data amount may also have great adverse impact on accuracy of neural network model compression. Therefore, weights of the data in the loss function of the KD method can be adjusted, so that a change of a data amount in a class with a smaller data amount causes a greater change to the weight $$w_{kd}^{k},$$

but a change of a data amount in a class with a larger data amount causes a smaller change to the weight $$w_{kd}^{k}.$$

The weight $$w_{kd}^{k}$$

may be defined as:

$$w_{kd}^{k} = \frac{K/y^k}{\sum_{k=1}^{K} 1/y^k},\ k = 1, 2, \ldots, K.$$

K is a quantity of classes obtained by classifying the extended data by the first neural network, and $y^k$ denotes a quantity of images of a $k^{th}$ class in first data of the K classes. It should be understood that the foregoing expression of the weight $$w_{kd}^{k}$$

is only an example, and $$w_{kd}^{k}$$

may also be determined based on other functions.

Weights of all of the K classes form a weight vector:

$$w_{kd} = \begin{Bmatrix} w_{kd}^{1} \\ w_{kd}^{2} \\ \ldots \\ w_{kd}^{K} \end{Bmatrix}.$$

The loss function of the KD method may be expressed as:

$$L_{KD} = \frac{1}{n}\sum_{i} w^i L_c(y_i^{te}, y_i^{st}).$$

$L_c$ denotes a loss of an $i^{th}$ piece of data, n is an input data amount, and $$n = \sum_{k} y^k.$$

$w^i$ denotes a weight corresponding to a class to which the $i^{th}$ piece of data belongs, and $$w^i = {}_{kd}^{k},$$

where k is a position of a largest element in $$y_i^{te},$$

that is, the class to which the image belongs, and $w^i$ may be determined based on a processing result of the first neural network model for the input picture.

$$y_i^{te}$$

may be a vector output by the first neural network model. Each element in the vector corresponds to a class that can be processed by the first neural network model and represents a probability that the input picture belongs to the class. Alternatively, $$y_i^{te}$$

may be a soft probability distribution, that is, $$y_i^{te}$$

may be obtained by normalizing a vector output by the first neural network model, that is, $$y_i^{te} = \text{softmax}\left(\frac{z_i}{T}\right).$$

$z_i$ is a vector output by the first neural network model, each element in the vector corresponds to a class that can be processed by the first neural network model, and T is a temperature parameter. Based on the output $z_i$ of the first neural network model or the soft probability distribution $$y_i^{te},$$

a class to which an input picture corresponding to $z_i$ or $$y_i^{te}$$

belongs may be determined.

A difference from the conventional knowledge distillation method is as follows: In this embodiment, a parameter w is added during calculation of the loss function of the KD method, and a corresponding weight is added to each piece of training data to distinguish importance of different data. If an amount of data is smaller, a weight of the data is greater, indicating that importance of the data is higher. Once the data with a small data amount is incorrectly classified, a relatively large penalty is imposed on the classifier. Correspondingly, if an amount of data is larger, the data is less important for the classifier.

$$y_i^{te}$$

may denote a classification result of the first neural network model for the input image, and the classification result may be different from a class to which the input image actually belongs. In other words, noise exists in $$\{y_i^{te}\}.$$

Therefore, the weight $$w_{kd}^k$$

determined based on the classification result of the first neural network model may not be an optimal result.

Random perturbation is performed on the weight $$w_{kd}^k$$

or the data amount $y^k$ to obtain a plurality of perturbed weights. There is a small difference between a data amount of each class in the classification result of the first neural network model for the extended data and a data amount of each class to which the extended data actually belongs. Therefore, there is no great difference between $$w_{kd}^k$$

and an actual weight. A preset range is set. A range in which $y^k$ is adjusted in quantity is narrower than the preset range. For example, for each $y^k$, an increased or decreased quantity or proportion is less than the preset value, or an increased or decreased quantity or proportion of the weight $$w_{kd}^k$$

is less than the preset value.

Perturbed weight vectors form a weight vector matrix:

$$W = \{w_{kd\_1}, w_{kd\_2}, \ldots, w_{kd\_n}\},$$

where $w_{id\_1}$, $w_{id\_2}$, . . . , $w_{id\_n}$ are respectively weight vectors corresponding to N perturbation cases.

Based on the weight matrix, a parameter of the original neural network model is adjusted, and the second neural network model is trained. A finally optimized second neural network model $N_{st}$ may be obtained by solving the following equation:

$$N_{st}^W = \arg\min \max_{w \in W} L_{KD}(N_{st}, w).$$

When the weight vector is w, a loss function between output results of the second neural network model $N_{st}$ and the first neural network model is:

$$L_{KD}(N_{st}, w).$$

For the N perturbation cases, that is, N different weight vectors w, a maximum value of the loss function may be expressed as:

$$\max_{w \in W} L_{KD}(N_{st}, w).$$

A parameter of the second neural network model is adjusted, so that the maximum value of the loss function in different perturbation cases is reduced as much as possible, that is, the maximum value of the loss function of the KD method is minimized. An adjusted student network model $N_{st}$ may be used as a compressed second neural network model.

In different perturbation cases, the maximum value of the loss function of the KD method is less than the preset value, that is, in different perturbation cases, there is no great difference between image processing results of the second neural network model and the first neural network model. Therefore, in the foregoing manner, adverse impact of noise caused by extending positive sample data on neural network model compression can be reduced, and accuracy of the compressed neural network model can be improved.

FIG. 9 is a schematic flowchart of a neural network compression method according to an embodiment.

A first server obtains first data uploaded by user equipment. The first data is training data of the first neural network model. The first server may train a PU classifier based on the first data and stored second data.

A second server selects stored third data by using the PU classifier, to obtain extended data.

The second server obtains the first neural network model uploaded by the user equipment and trains a second neural network model by using a KD method based on the extended data. The first neural network model is used as a teacher network model of the KD method to obtain a compressed teacher network model of the KD method.

The second server may send the second neural network model to the user equipment.

The first data is all or a part of the training data of the first neural network model. The first data includes data of each of a plurality of classes output by the first neural network model. The first server may train the PU classifier based on a PU algorithm. For a principle of the PU algorithm, refer to the description of FIG. 5.

Data that belongs to a class output by the first neural network model may be referred to as positive sample data. The second data includes unlabeled data. The second data includes positive sample data and data other than the positive sample data. The positive sample data has a property and distribution similar to a property and distribution of the training data of the first neural network model.

The neural network model compression process may be performed by two dedicated servers. One of the two servers may be dedicated to centralized processing of training of the PU classifier, and the other server may be dedicated to performing a process of positive sample data selection and knowledge distillation based on the obtained neural network model and the corresponding PU classifier. Performing centralized processing on the training of the PU classifier and the process of knowledge distillation can increase a speed of neural network model compression.

The neural network model compression method provided in this embodiment s is verified. Tests are performed on data sets ImageNet, Flicker1M, and Modified National Institute of Standards and Technology database (MNIST).

Table 1 is a test result obtained by classifying pictures in the ImageNet data set.

A ResNet-34 network is used as the first neural network model uploaded by the user. For each class that can be processed by the ResNet-34 network, $n_l$ pictures are randomly selected from a data set published by the Canadian Institute for Advanced Research (CIFAR-10). Pictures of all classes that are selected are used as the first data uploaded by the user, the ImageNet data set is used as a cloud unlabeled data set, and a ResNet-18 network is used as a student network model.

TABLE 1

| Methods | $n_l$ | $n_t$ | Data source | Accuracy |
|---|---|---|---|---|
| Teacher network model | — | 50,000 | Raw data | 95.61 |
| KD | — | 50,000 | Raw data | 94.40 |
| Artificial classification | — | 269,427 | Manually selected data | 93.44 |
| PU-s1 | 100 | 100,608 | PU data | 93.75 |
| | 50 | 94,803 | | 93.02 |
| | 20 | 74,663 | | 92.23 |
| PU-s1 | 100 | 50,000 | PU data | 91.56 |
| | 50 | 50,000 | | 91.33 |
| | 20 | 50,000 | | 91.27 |

The teacher network model is an uncompressed first neural network model, and KD is a classification result obtained through training on the complete CIFAR-10 by using the knowledge distillation method. The artificial classification method is to select positive sample data from the ImageNet data set through artificial classification and send the data to RKD to train the second neural network model. PU-s1 is to select positive sample data by using the PU method and send all the data to RKD to train the second neural network model. PU-s2 is to select positive sample data by using the PU method, randomly select training data with a same data amount as the original training set CIFAR-10 and send the training data to RKD to train the second neural network model. The result shows that, picture classification accuracy of the method provided in this embodiment is even higher than that of a method of manually selecting data.

Table 2 is a test result obtained by classifying pictures in the Flicker1M data set.

A ResNet-34 network is used as the first neural network model uploaded by the user. For each class that can be processed by the ResNet-34 network, $n_l$ pictures are randomly selected from the ImageNet data set. Pictures of all classes that are selected are used as the first data uploaded by the user, the Flicker1M data set is used as a cloud unlabeled data set, and a ResNet-18 network is used as a student network model.

TABLE 2

| Methods | $n_t$ | Data source | Top-1 acc (%) | Top-5 acc (%) |
|---|---|---|---|---|
| Teacher network model | 1,281,167 | Raw data | 73.27 | 91.26 |
| KD-all | 1,281,167 | Raw data | 68.67 | 88.76 |
| KD-500k | 500,000 | Raw data | 63.90 | 85.88 |
| PU-s1 | 690,978 | PU data | 61.92 | 86.00 |
| PU-s1 | 500,000 | PU data | 61.21 | 85.33 |

The teacher network model is an uncompressed first neural network model, and KD-all is a classification result obtained through training on the complete ImageNet data set by using the knowledge distillation method. KD-500k is a classification result obtained by using the knowledge distillation method and randomly selecting 500,000 pieces of data on the ImageNet data set. PU-s1 and PU-s2 are the same as above. Top-1 acc (%) indicates that one label vector with a highest probability among predicted label vectors is selected as a prediction result. If the result is the same as a real label, the result is correct. Top-5 acc (%) indicates that five label vectors with a highest probability among predicted label vectors are selected as a prediction result. If any label in the result is the same as a real label, the result is correct. The result shows that the top-5 accuracy of the positive sample data determined by using the method provided in this embodiment is higher than that of a classification result of a second neural network model obtained by using training data in an original data set.

Table 3 is a test result obtained by classifying pictures in an EMNIST data set.

A convolutional neural network model LeNet-5 network is used as the teacher network model, and 1, 2, 5, 10, and 20 images in the MNIST data set are randomly selected separately from data of each class that can be processed by the teacher network model, to form the first data. The EMNIST data set is used as cloud unlabeled data. Channel layers of all layers of the LeNet-5 network are reduced by half and used as the second neural network model.

TABLE 3

| Methods | 1 | 2 | 5 | 10 | 20 |
|---|---|---|---|---|---|
| PU-s1 | 98.5 | 98.7 | 98.7 | 98.8 | 98.9 |
| PU-s1 | 98.3 | 98.5 | 98.5 | 98.6 | 98.6 |

The result shows that, as a quantity of images of each class in the first data increases, accuracy of neural network model compression is improved. Even if a quantity of pictures of each class in the first data is very small (only one picture is used), a relatively good result of neural network model compression can be achieved (accuracy is higher than 98%).

Figure 10:
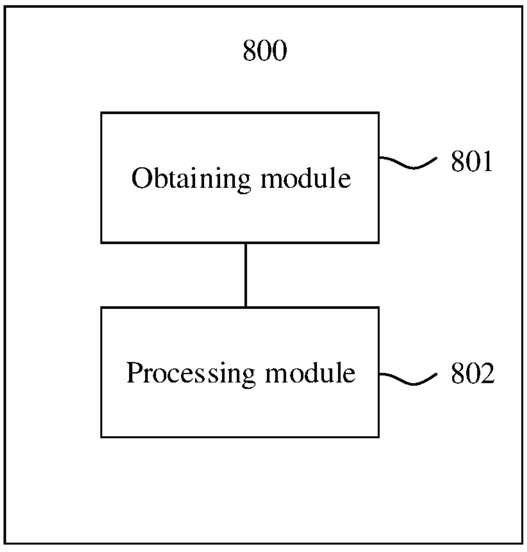
FIG. 10 is a schematic diagram of a structure of a neural network model compression apparatus according to an embodiment.

FIG. 10 is a schematic diagram of a structure of a communications apparatus according to an embodiment. The apparatus 800 includes an obtaining module 801 and a processing module 802.

The obtaining module 801 is configured to obtain a first neural network model and training data of the first neural network that are uploaded by user equipment.

The processing module 802 is configured to obtain a positive-unlabeled (PU) classifier by using a PU learning algorithm based on the training data of the first neural network and unlabeled data stored in a server.

The processing module 802 is further configured to select, by using the PU classifier, extended data from the unlabeled data stored in the server, where the extended data is data having a property and distribution similar to a property and distribution of the training data of the first neural network model.

The processing module 802 is further configured to train a second neural network model by using a knowledge distillation (KD) method based on the extended data, where the first neural network model is used as a teacher network model of the KD method and the second neural network model is used as a student network model of the KD method.

Optionally, the processing module 802 is further configured to obtain the positive-unlabeled (PU) classifier by using the PU learning algorithm based on the training data of the first neural network, the unlabeled data stored in the server, and proportion information, where a loss function of the PU learning algorithm is an expectation of a training loss of the training data of the first neural network and the unlabeled data stored in the server, the proportion information is used to indicate a proportion of the extended data to the unlabeled data stored in the server, and the proportion information is used to calculate the expectation.

Optionally, the PU classifier is obtained based on a first feature and the proportion information, the first feature is obtained based on fusion of a plurality of third features, the plurality of third features are obtained by performing feature extraction by using the first neural network model on the training data of the first neural network and the unlabeled data stored in the server, and the plurality of third features are in a one-to-one correspondence with a plurality of layers of the first neural network.

The processing module 802 is further configured to perform, by using the first neural network model, feature extraction on the unlabeled data stored in the server, to obtain a second feature.

The processing module 802 is further configured to input the second feature into the PU classifier, to determine the extended data.

Optionally, the first feature is obtained by fusing the plurality of third features that undergo a first weight adjustment, the first weight adjustment is performed based on the proportion information, the second feature is obtained by fusing a plurality of fourth features by using a first weight, and the plurality of fourth features are in a one-to-one correspondence with the plurality of layers of the first neural network.

Optionally, the training data of the first neural network model is a part of training data used to train the first neural network model.

Optionally, the part of training data includes data of each of a plurality of classes output by the first neural network.

Optionally, the processing module 802 is further configured to input the extended data into the first neural network model, to classify the extended data and obtain extended data of a plurality of classes and a second weight of extended data of each of the plurality of classes.

The processing module 802 is further configured to minimize a loss function of the KD method, to obtain a trained second neural network model, where the loss function of the KD method is a sum of products of training errors of extended data of all of the plurality of classes and second weights of the extended data of all the classes.

Optionally, the second weights of the extended data of all the classes include a plurality of perturbed weights obtained after random perturbation is performed on initial weights of the extended data of all the classes, and the loss function of the KD method includes a plurality of loss functions in a one-to-one correspondence with the plurality of perturbed weights, where an initial weight of the extended data of each class is in negative correlation with an amount of the extended data of each class; and the processing module 802 is further configured to minimize maximum values of the plurality of loss functions, to obtain the trained second neural network model.

Figure 11:
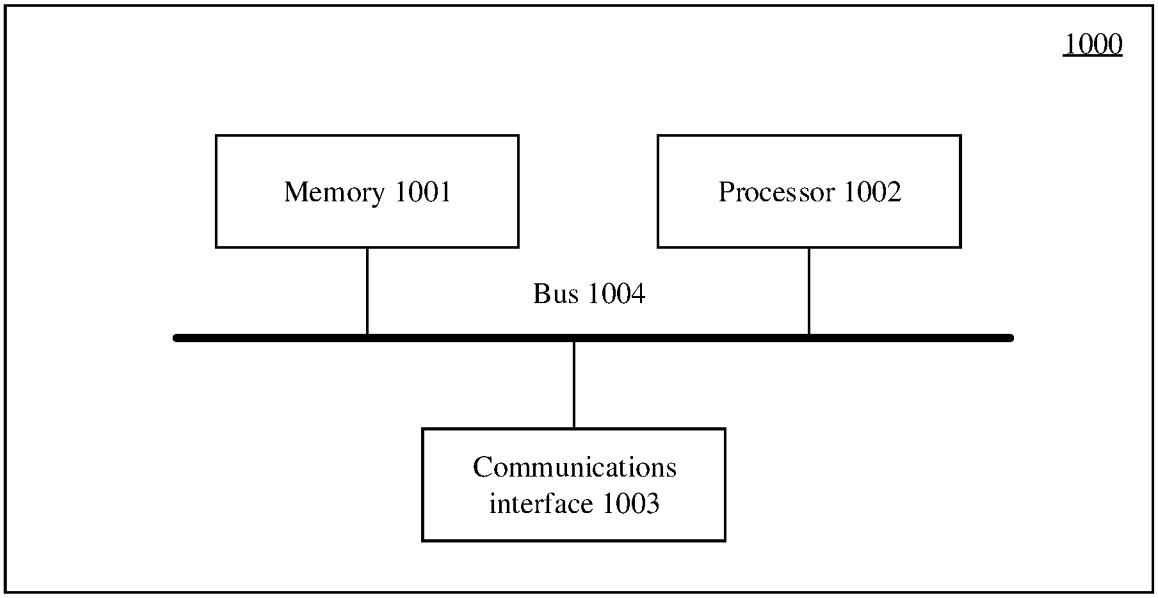
FIG. 11 is a schematic diagram of a hardware structure of a neural network model compression apparatus according to an embodiment.

FIG. 11 is a schematic diagram of a hardware structure of an electronic device according to an embodiment. An electronic apparatus 1000 (the apparatus 1000 may be a computer device) shown in FIG. 10 includes a memory 1001, a processor 1002, a communications interface 1003, and a bus 1004. The memory 1001, the processor 1002, and the communications interface 1003 are communicatively connected to each other through the bus 1004.

The memory 1001 may be a read-only memory (ROM), a static storage device, a dynamic storage device, or a random access memory (RAM). The memory 1001 may store a program. When the program stored in the memory 1001 is executed by the processor 1002, the processor 1002 and the communications interface 1003 are configured to perform the steps of the convolutional neural network compression method in the embodiments.

The processor 1002 may use a general-purpose central processing unit (CPU), a microprocessor, an application-specific integrated circuit (ASIC), a graphics processing unit (GPU), or one or more integrated circuits, and is configured to execute a related program, to implement a function that needs to be performed by a unit in the neural network compression apparatus in this embodiment, or perform the neural network compression method in the method embodiment.

Alternatively, the processor 1002 may be an integrated circuit chip, and has a signal processing capability. In an implementation process, the steps of the neural network compression method may be completed by using a hardware integrated logic circuit in the processor 1002 or an instruction in a form of software. Alternatively, the processor 1002 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and logic block diagrams in the embodiments may be implemented or performed. The general-purpose processor may be a microprocessor, or the processor may be any conventional processor or the like. Steps of the methods with reference to the embodiments may be directly executed and accomplished by using a hardware decoding processor or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 1001. The processor 1002 reads information in the memory 1001, and completes, in combination with hardware of the processor 1002, the functions that need to be performed by the units included in the neural network compression apparatus in this embodiment or performs the neural network compression method in the method embodiments.

The communications interface 1003 uses a transceiver apparatus, for example but not for limitation, a transceiver, to implement communication between the apparatus 1000 and another device or a communications network. For example, the communications interface 1003 may be used to obtain one or more of first data, second data, proportion information of positive sample data in the second data, a parameter of a first neural network model, and a PU classifier.

The bus 1004 may include a path for transmitting information between the components (for example, the memory 1001, the processor 1002, and the communications interface 1003) of the apparatus 1000.

An embodiment further provides a neural network model compression apparatus, including at least one processor and a communications interface. The communications interface is used by the neural network model compression apparatus to exchange information with another apparatus. When program instructions are executed by the at least one processor, the neural network model compression apparatus is enabled to perform the foregoing method.

An embodiment further provides a computer-readable storage medium. The computer-readable medium has program instructions, and when the program instructions are executed directly or indirectly, the foregoing method is implemented.

According to an embodiment, a chip is further provided. The chip includes at least one processor, and when program instructions are executed by the at least one processor, the foregoing method is performed.

A person of ordinary skill in the art may be aware that units and algorithm steps in the examples described with reference to the embodiments may be implemented by electronic hardware or a combination of computer software and electronic hardware. Whether the functions are performed by hardware or software depends on particular applications and design constraint conditions of the solutions. A person skilled in the art may use different methods to implement the described functions of each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments, it should be understood that the system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, function units in the embodiments may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the solutions essentially, or the part contributing to the conventional technology, or some of the solutions may be implemented in a form of a software product. The computer software product is stored in a storage medium and includes several instructions for instructing a computer device (which may be a personal computer, a server, or a network device) to perform all or some of the steps of the method described in the embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations, but are not intended to limit the scope of the embodiments. Any variation or replacement readily figured out by a person skilled in the art shall fall within the scope of the embodiments.

What is claimed is:

1. A neural network model compression method, comprising:

obtaining, by a server, a first neural network model and training data of the first neural network model that are uploaded by user equipment;

obtaining, by the server, a positive-unlabeled (PU) classifier by using a PU learning algorithm based on the training data of the first neural network model and unlabeled data stored in the server;

selecting, by the server by using the PU classifier, extended data from the unlabeled data stored in the server, wherein the extended data is positive sample data determined by the PU classifier and has a property and distribution similar to a property and distribution of the training data of the first neural network model; and training, by the server, a second neural network model by using a knowledge distillation (KD) method based on the extended data, wherein the first neural network model is used as a teacher network model of the KD method and the second neural network model is used as a student network model of the KD method;

wherein the PU classifier is obtained based on a first feature and a proportion information, the first feature is obtained based on fusion of a plurality of third features and the plurality of third features are in a one-to-one correspondence with a plurality of layers of the first neural network; and the method further comprising:

inputting, by the server, the extended data into the first neural network model, to classify the extended data and obtain extended data of the plurality of classes and a second weight of extended data of each of the plurality of classes; and minimizing, by the server, a loss function of the KD method, to obtain a trained second neural network model, wherein the loss function of the KD method is a sum of products of training errors of extended data of all of the plurality of classes and second weights of the extended data of all the classes; and wherein the second weights of the extended data of all the classes comprise a plurality of perturbed weights obtained after random perturbation is performed on initial weights of the extended data of all the classes, and the loss function of the KD method comprises a plurality of loss functions in a one-to-one correspondence with the plurality of perturbed weights, wherein an initial weight of the extended data of each class is in negative correlation with an amount of the extended data of each class; and minimizing, by the server, maximum values of the plurality of loss functions, to obtain the trained second neural network model.

2. The neural network model compression method according to claim 1, further comprising:

obtaining, by the server, the PU classifier by using the PU learning algorithm based on the training data of the first neural network, the unlabeled data stored in the server, and the proportion information, wherein a loss function of the PU learning algorithm is an expectation of a training loss of the training data of the first neural network and the unlabeled data stored in the server, the proportion information is used to indicate a proportion of the extended data to the unlabeled data stored in the server, and the proportion information is used to calculate the expectation.

3. The neural network model compression method according to claim 1, wherein the plurality of third features are obtained by performing feature extraction by using the first neural network model on the training data of the first neural network and the unlabeled data stored in the server; and further comprising:

performing, by the server by using the first neural network model, feature extraction on the unlabeled data stored in the server, to obtain a second feature; and inputting, by the server, the second feature into the PU classifier, to determine the extended data.

4. The neural network model compression method according to claim 1, wherein the first feature is obtained by fusing the plurality of third features that undergo a first weight adjustment, the first weight adjustment is performed based on the proportion information, the second feature is obtained by fusing a plurality of fourth features by using a first weight, and the plurality of fourth features are in a one-to-one correspondence with the plurality of layers of the first neural network.

5. The neural network model compression method according to claim 1, wherein the training data of the first neural network model is a part of training data used to train the first neural network model.

6. The neural network model compression method according to claim 5, wherein the part of training data comprises data of each of a plurality of classes output by the first neural network.

7. A neural network model compression apparatus, comprising a memory and a processor, wherein the memory is configured to store a computer program, and the processor is configured to invoke the computer program from the memory and run the computer program to perform a neural network compression method comprising:

obtaining, by a server, a first neural network model and training data of the first neural network model that are uploaded by user equipment;

obtaining, by the server, a positive-unlabeled (PU) classifier by using a PU learning algorithm based on the training data of the first neural network model and unlabeled data stored in the server;

selecting, by the server by using the PU classifier, extended data from the unlabeled data stored in the server, wherein the extended data is positive sample data determined by the PU classifier and has a property and distribution similar to a property and distribution of the training data of the first neural network model;

training, by the server, a second neural network model by using a knowledge distillation (KD) method based on the extended data, wherein the first neural network model is used as a teacher network model of the KD method and the second neural network model is used as a student network model of the KD method; and wherein the PU classifier is obtained based on a first feature and a proportion information, the first feature is obtained based on fusion of a plurality of third features and the plurality of third features are in a one-to-one correspondence with a plurality of layers of the first neural network; and wherein the processor is further configured to:

input, by the server, the extended data into the first neural network model, to classify the extended data and obtain extended data of the plurality of classes and a second weight of extended data of each of the plurality of classes; and minimize, by the server, a loss function of the KD method, to obtain a trained second neural network model, wherein the loss function of the KD method is a sum of products of training errors of extended data of all of the plurality of classes and second weights of the extended data of all the classes;

wherein the second weights of the extended data of all the classes comprise a plurality of perturbed weights obtained after random perturbation is performed on initial weights of the extended data of all the classes, and the loss function of the KD method comprises a plurality of loss functions in a one-to-one correspondence with the plurality of perturbed weights, wherein an initial weight of the extended data of each class is in negative correlation with an amount of the extended data of each class; and the processor is further configured to:

minimize, by the server, maximum values of the plurality of loss functions, to obtain the trained second neural network model.

8. The neural network model compression apparatus according to claim 7, wherein the processor is further configured to:

obtain, by the server, the PU classifier by using the PU learning algorithm based on the training data of the first neural network, the unlabeled data stored in the server, and the proportion information, wherein a loss function of the PU learning algorithm is an expectation of a training loss of the training data of the first neural network and the unlabeled data stored in the server, the proportion information is used to indicate a proportion of the extended data to the unlabeled data stored in the server, and the proportion information is used to calculate the expectation.

9. The neural network model compression apparatus according to claim 7, wherein the plurality of third features are obtained by performing feature extraction by using the first neural network model on the training data of the first neural network and the unlabeled data stored in the server, and the processor is further configured to:

perform, by the server by using the first neural network model, feature extraction on the unlabeled data stored in the server, to obtain a second feature; and input, by the server, the second feature into the PU classifier, to determine the extended data.

10. The neural network model compression apparatus according to claim 7, wherein the first feature is obtained by fusing the plurality of third features that undergo a first weight adjustment, the first weight adjustment is performed based on the proportion information, a second feature is obtained by fusing a plurality of fourth features by using a first weight, and the plurality of fourth features are in a one-to-one correspondence with the plurality of layers of the first neural network.

11. The neural network model compression apparatus according to claim 7, wherein the training data of the first neural network model is a part of training data used to train the first neural network model.

12. The neural network model compression apparatus according to claim 11, wherein the part of training data comprises data of each of a plurality of classes output by the first neural network.

13. A non-transitory computer-readable storage medium, wherein the non-transitory computer-readable medium stores program code executed by a device, and the program code is used to perform the method, comprising:

obtaining, by a server, a first neural network model and training data of the first neural network model that are uploaded by user equipment;

obtaining, by the server, a positive-unlabeled (PU) classifier by using a PU learning algorithm based on the training data of the first neural network model and unlabeled data stored in the server;

selecting, by the server by using the PU classifier, extended data from the unlabeled data stored in the server, wherein the extended data is positive sample data determined by the PU classifier and has a property and distribution similar to a property and distribution of the training data of the first neural network model;

training, by the server, a second neural network model by using a knowledge distillation (KD) method based on the extended data, wherein the first neural network model is used as a teacher network model of the KD method and the second neural network model is used as a student network model of the KD method; and wherein the PU classifier is obtained based on a first feature and a proportion information, the first feature is obtained based on fusion of a plurality of third features and the plurality of third features are in a one-to-one correspondence with a plurality of layers of the first neural network; and the method further comprising:

inputting, by the server, the extended data into the first neural network model, to classify the extended data and obtain extended data of the plurality of classes and a second weight of extended data of each of the plurality of classes; and minimizing, by the server, a loss function of the KD method, to obtain a trained second neural network model, wherein the loss function of the KD method is a sum of products of training errors of extended data of all of the plurality of classes and second weights of the extended data of all the classes; and wherein the second weights of the extended data of all the classes comprise a plurality of perturbed weights obtained after random perturbation is performed on initial weights of the extended data of all the classes, and the loss function of the KD method comprises a plurality of loss functions in a one-to-one correspondence with the plurality of perturbed weights, wherein an initial weight of the extended data of each class is in negative correlation with an amount of the extended data of each class; and minimizing, by the server, maximum values of the plurality of loss functions, to obtain the trained second neural network model.

14. The medium according to claim 13, further comprising:

obtaining, by the server, the PU classifier by using the PU learning algorithm based on the training data of the first neural network, the unlabeled data stored in the server, and the proportion information, wherein a loss function of the PU learning algorithm is an expectation of a training loss of the training data of the first neural network and the unlabeled data stored in the server, the proportion information is used to indicate a proportion of the extended data to the unlabeled data stored in the server, and the proportion information is used to calculate the expectation.

15. The non-transitory computer-readable storage medium according to claim 13, wherein the plurality of third features are obtained by performing feature extraction by using the first neural network model on the training data of the first neural network and the unlabeled data stored in the server; and further comprising:

performing, by the server by using the first neural network model, feature extraction on the unlabeled data stored in the server, to obtain a second feature; and inputting, by the server, the second feature into the PU classifier, to determine the extended data.

* * * * *